United States Patent
Martin et al.

(10) Patent No.: US 7,144,945 B2
(45) Date of Patent: Dec. 5, 2006

(54) AQUEOUS COATING COMPOSITION COMPRISING NON-CROSSLINKABLE OLIGOMER(S) AND DISPERSED POLYMER(S)

(75) Inventors: Emilio Martin, Waalwijk (NL); Jurgen Scheerder, Waalwijk (NL); Gerardus Cornelis Overbeek, Waalwijk (NL); Ronald Tennebroek, Waalwijk (NL); Tijs Nabuurs, Waalwijk (NL); Pablo Steenwinkel, Waalwijk (NL)

(73) Assignee: DSM IP Assets B.V., Heerien (NL)

( * ) Notice: Subject to any disclaimer, the term of this patent is extended or adjusted under 35 U.S.C. 154(b) by 16 days.

(21) Appl. No.: 10/509,223

(22) PCT Filed: Mar. 21, 2003

(86) PCT No.: PCT/GB03/01215

§ 371 (c)(1),
(2), (4) Date: Sep. 24, 2004

(87) PCT Pub. No.: WO03/082999

PCT Pub. Date: Oct. 9, 2003

(65) Prior Publication Data

US 2005/0182180 A1    Aug. 18, 2005

(30) Foreign Application Priority Data

Mar. 28, 2002 (GB) .................. 0207351.8

(51) Int. Cl.
*C08K 3/20* (2006.01)
(52) U.S. Cl. .................. 524/501; 524/527; 524/589; 524/590; 524/591
(58) Field of Classification Search ............... 524/501, 524/507, 589, 590, 591
See application file for complete search history.

(56) References Cited

U.S. PATENT DOCUMENTS

| | | | |
|---|---|---|---|
| 4,552,908 A | 11/1985 | Nicks et al. | 523/504 |
| 4,647,610 A | 3/1987 | Sperry et al. | 524/377 |
| 6,303,189 B1 | 10/2001 | Gray et al. | 427/385.5 |
| 2004/0039089 A1* | 2/2004 | Buckmann et al. | 524/104 |

FOREIGN PATENT DOCUMENTS

EP    0 792 899 A1    9/1997

* cited by examiner

*Primary Examiner*—Edward J. Cain
(74) *Attorney, Agent, or Firm*—Morgan Lewis & Bockius LLP

(57) ABSTRACT

An aqueous coating composition containing a non-crosslinkable water-dispersible oligomer(s); a dispersed polymer(s); water and optionally co-solvent wherein the composition has an open time of at least 20 minutes; a wet edge time of at least 10 minutes; a tack free time of ≦24 hours and an equilibrium viscosity of 5,000 Pa·s.

16 Claims, 2 Drawing Sheets

Shear Rate 0.1 s⁻¹

Shear Rate 1.0 s⁻¹

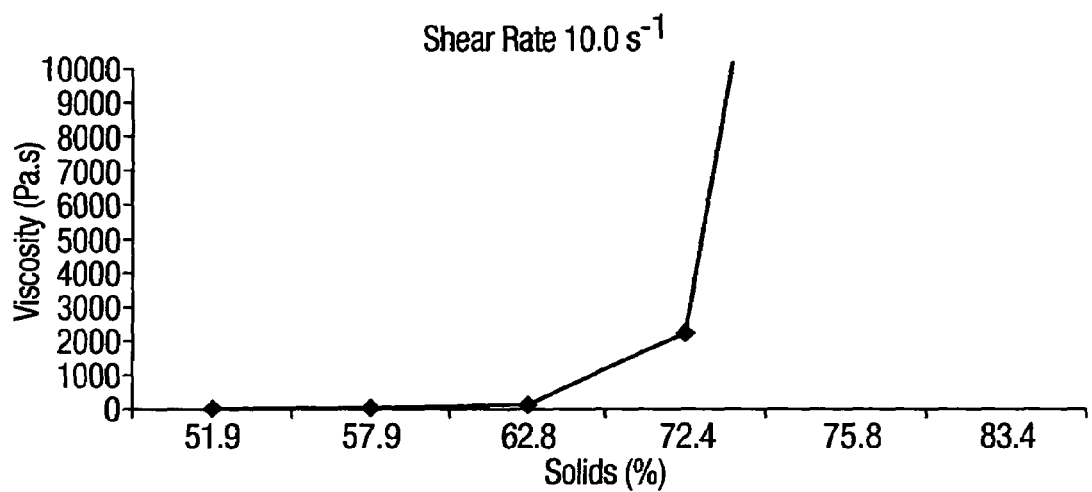
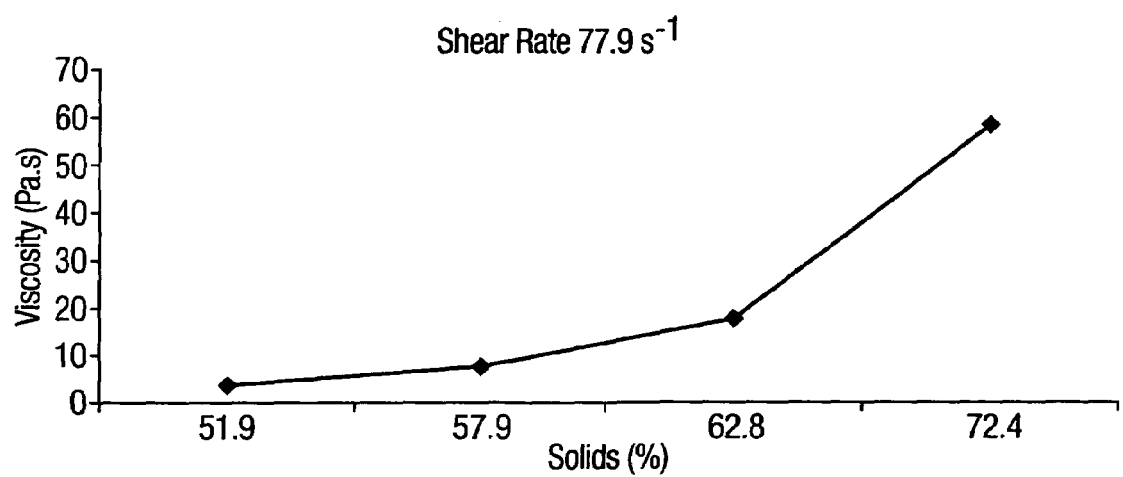

AQUEOUS COATING COMPOSITION COMPRISING NON-CROSSLINKABLE OLIGOMER(S) AND DISPERSED POLYMER(S)

The present invention relates to certain compositions comprising a non-crosslinkable oligomer(s) which, inter alia, provide coatings having improved open and wet edge times as well as good tack-free times.

A general need when applying a decorative or protective coating to a substrate, is to be able to repair irregularities in the still-wet coating after some time has elapsed, for example by re-brushing over a freshly coated wet substrate, or by applying more of the coating composition over a previously coated substrate either over the main area of the coating or an edge of the coating or even blending a drop into the coating without in each case vitiating the complete merging of any boundaries in the vicinity of the repaired irregularity. Traditionally compositions containing binder polymers dissolved in organic solvents are used and the organic solvents are employed to modify the drying characteristics of the coated composition. For example, organic solvent based alkyds with an open time of 30 to 45 minutes are available in the decorative "Do-it-Yourself" DIY market. However the disadvantage of organic solvent based coatings is the toxic and flammable nature of such solvents and the pollution and odour caused on evaporation as well as the relatively high cost of organic solvents.

Thus with the continuing concern about the use of organic solvent based coating compositions there has been a long felt need for an aqueous coating composition with comparable properties to those achievable using organic solvent based compositions.

Unfortunately, aqueous polymer coating compositions currently known in the art do not offer a combination of drying properties which would make them fully comparable (or even superior to) solvent-based coatings, and in particular do not provide desirably long open and wet edge times together with desirably short tack-free times.

U.S. Pat. No. 6,303,189 discloses a method for increasing the open time of an aqueous coating composition comprising mixing a film forming latex polymer with a polyurethane polymer having a lower Tg than the latex polymer.

U.S. Pat. No. 5,326,808 discloses a paint composition comprising a polymeric binder prepared by polymerising a vinyl acetate monomer in the presence of an oligomer. WO 00/24837 discloses an aqueous coating composition comprising a blend of a polyurethane/acrylate hybrid and a polyurethane dispersion with open times up to and around 7 minutes and a wet edge time of up to 4 minutes. U.S. Pat. No. 5,270,380 discloses improving open time through the interaction of a latex polymer and a modifying compound which becomes chemically bound to the latex polymer.

Thus, very commonly, aqueous-based polymer coating compositions employ dispersed high molecular weight polymers as the binder materials thereof. This results in, inter alia, a short wet edge time when the coating composition is dried because the dispersed polymer particles tend to coalesce in the edge region of an applied coating very soon after a wet coating has been applied (probably due to the maximum packing fraction of the polymer particles having been reached) to form a continuous film, and since the polymer of this film is of high viscosity because of its highly molecular weight, the lapping (i.e. wet edge) time of the composition is poor.

It has been shown by viscosity measurements taken during drying that existing alkyd emulsions have a high viscosity phase inversion peak during drying. (Phase inversion is defined as the transition from a binder in a continuous water phase to water in a continuous binder phase which occurs during drying). The consequence is a difficulty in re-brushing which starts a few minutes after application of the coating.

It is known from the prior art that a longer wet edge or open time is achievable by using solution-type aqueous oligomers (EP 0136025 B1) which can be diluted with large amounts of organic solvent(s) in order to create a low viscosity continuous phase during drying of the film and these are generally unacceptably water-sensitive.

From the literature it is also known that open time is easily prolonged by using low solids contents in the aqueous polymer compositions, but this generally results in the need to apply many layers of paint (for good opacity). In addition, the wet edge time is generally only moderately influenced by reducing the solids content of an aqueous coating composition with water.

Longer times for repairing irregularities can be achieved by employing aqueous polymer coating compositions in which the binder polymers have very low viscosities. However, hitherto, a problem with using such low viscosity polymer binders, is that the resultant coatings have a slow drying rate, resulting in the coating remaining tacky for an unacceptably long time. A coating should preferably also dry sufficiently quickly to avoid the adherence of dust and to ensure that the coating quickly becomes waterproof (in case of outdoor applications), and, as discussed above, quickly becomes tack-free.

Indeed, the difficulty in developing aqueous polymer coating compositions having a desirable combination of drying properties when coated onto a substrate has been particularly discussed in an interview given by Professor Rob van der Linde (Professor of Coatings Technology, University of Technology, Eindhoven, NL) and Kees van der Kolk (Sigma Coatings) and reported in "Intermediair" Oct. 6, 1999, 35(23), pages 27–29. In this interview, concerning environmentally friendly paints, there is described the problem of applying aqueous paints where even the professional painter has little enough time to correct any irregularities when needed. This is contrasted (in the interview) with solvent-based paints (e.g. alkyd paints) which are workable for a much longer time but have the disadvantage that the organic solvents, forming a major component of such compositions, are toxic and expensive. The interview also mentions that in the coming years, three universities will cooperate in a project to overcome the drying disadvantages of aqueous paints. Thus this interview emphasises the current and continuing need and desirability for achieving aqueous polymer coatings compositions having improved drying properties.

WO 02/32980, WO 02/33008, WO 02/33012 and WO 02/32982 all disclose aqueous coating composition comprising crosslinkable oligomers with open times of at least 20 minutes where the crosslinkability helps the balance between a prolonged open time and a short tack free time.

The open time for a coating composition is, in brief, the period of time that the main area (the bulk) of an applied aqueous coating remains workable after it has been applied to a substrate, in the sense that during this period re-brushing or application of more coating over the main area of a freshly coated wet substrate is possible without causing defects such as brush marks in the final dried coating. (A more formal definition of open time is provided later in this specification).

The wet edge time for a coating composition is, in brief, the period of time that the edge region of an applied aqueous coating remains workable after it has been applied to a substrate, in the sense that during this period re-brushing or application of more coating over the edge region of a freshly coated wet substrate is possible without causing defects such as lap lines in the final dried coating. (A more formal definition of wet edge time is provided later in this specification).

We have now invented aqueous coating compositions having a very advantageous combination of drying properties, particularly with regard to open time, wet edge time and tack-free time as discussed above, and which (surprisingly in view of the comments by van der Linde and van der Kolk) avoid the drawbacks of the currently available compositions.

According to the present invention there is provided an aqueous coating composition comprising:
a) 1 to 64 wt % of a non-crosslinkable water-dispersible oligomer(s);
b) 4 to 76 wt % of a dispersed polymer(s);
c) 0 to 20 wt % of co-solvent;
d) 20 to 80 wt % of water;
where a)+b)+c)+d)=100%;
wherein the weight ratio of a):b) is in the range of from 8:92 to 80:20; and
wherein said composition when drying to form a coating has the following properties:
i) an open time of at least 20 minutes;
ii) a wet edge time of at least 10 minutes;
iii) a tack-free time of $\leq 24$ hours; and
iv) an equilibrium viscosity of $\leq 5,000$ Pa·s, at any solids content when drying in the range of from 20 to 55% by weight of the composition, using any shear rate in the range of from $9\pm0.5$ to $90\pm5$ s$^{-1}$ and at $23\pm2°$ C.

The presence of the non-crosslinkable oligomer(s) appears to provide the defined long open time and wet edge time, whilst the presence of the dispersed polymer(s) (e.g. in the form of a polymer latex) appears to assist in reducing the drying time of the composition.

Preferably the composition of the invention comprises a) 5 to 60 wt %, more preferably 8 to 40 wt % and most preferably 10 to 30 wt % of the non-crosslinkable water-dispersible oligomer(s).

Preferably the composition of the invention comprises b) 10 to 65 wt %, more preferably 15 to 55 wt % and most preferably 15 to 45 wt % of the dispersed polymer(s).

Preferably the composition of the invention comprises d) 30 to 75 wt %, more preferably 40 to 70 wt % and most preferably 45 to 70 wt % of water.

Open time is more formally defined as the maximum length of time, using the test method and under the specified conditions described later, in which a brush carrying the aqueous composition of the invention can be applied to the main area of a coating of the aqueous composition of the invention after which the coating flows back so as to result in a homogenous film layer.

Preferably the open time is at least 25 minutes, more preferably at least 30 minutes and most preferably at least 35 minutes.

Wet edge time is more formally defined as the maximum length of time, using the test method under the specified conditions described later, in which a brush carrying the aqueous composition of the invention can be applied to the edge region of a coating of the aqueous composition of the invention after which the coating flows back without leaving any lap lines in the final dried coating, so as to result in a homogenous film layer.

Preferably the wet-edge time is at least 12 minutes, more preferably at least 15 minutes, most preferably at least 18 minutes and especially at least 25 minutes.

The drying process of an applied invention composition can be divided in four stages namely the periods of time necessary to achieve respectively, dust-free, tack-free, thumb-hard and sandable coatings using the tests described herein.

Preferably the dust free time is $\leq 21$ hours, more preferably $\leq 16$ hours, still more preferably $\leq 5$ hours and especially $\leq 2$ hours.

Preferably the tack-free time is $\leq 20$ hours, more preferably $\leq 12$ hours and still more preferably $\leq 8$ hours.

Preferably the thumb hard time is $\leq 48$ hours, more preferably $\leq 24$ hours, more preferably $\leq 16$ hours and especially $\leq 10$ hours.

Preferably the resultant coating is sandable within 72 hours, more preferably within 48 hours, still more preferably within 24 hours and especially within 16 hours.

A co-solvent, as is well known in the coating art, is an organic solvent employed in an aqueous composition to improve the drying characteristics thereof. The invention composition can contain a co-solvent or a mixture of co-solvents. More preferably the invention composition can contain co-solvent or a mixture of co-solvents in a concentration $\leq 10\%$, more preferably $\leq 5\%$, most preferably $\leq 3\%$ and most especially 0% by weight based on the invention composition. Preferably the co-solvent has a molecular weight below 200 g/mol. The co-solvent may be organic solvent incorporated or used during preparation of the non-crosslinkable oligomer(s) and/or the dispersed polymer(s) or may have been added during formulation of the aqueous composition.

The equilibrium viscosity of the aqueous coating composition, when measured under the conditions as described above, is a suitable method for illustrating the drying characteristics of the aqueous coating composition. By the equilibrium viscosity of an aqueous composition at a particular shear rate and solids content is meant the viscosity measured when the aqueous composition has been subjected to the shear rate at for long enough to ensure that the viscosity measurement has reached a constant value.

If the composition is to remain brushable and workable during drying so that it has the desired open time and wet edge time, it is necessary that its equilibrium viscosity does not exceed defined limits during the drying process and hence over a range of solids contents. Accordingly the non-crosslinkable water-dispersible oligomer(s) which are used in this invention do not give a significant phase inversion viscosity peak, if any at all, during the drying process when the system inverts from one in which water is the continuous phase to one in which the continuous phase is a mixture of non-crosslinkable water-dispersible oligomer(s), solvent and optionally (part of the) water.

The shear rate to measure the equilibrium viscosity is preferably any shear rate in the range of from $0.9\pm0.05$ to $90\pm5$ s$^{-1}$, more preferably any shear rate in the range of from $0.09\pm0.005$ to $90\pm5$ s$^{-1}$.

Preferably the equilibrium viscosity of the aqueous coating composition of the invention is $\leq 1500$ Pa·s, more preferably $\leq 500$ Pa·s, especially $\leq 100$ Pa·s, and most especially $\leq 50$ Pa·s when measured as defined above.

Preferably, the composition of the invention has an equilibrium viscosity $\leq 5,000$ Pa·s when measured using any shear rate in the range of from $0.09\pm0.005$ to $90\pm5$ s$^{-1}$, and an equilibrium viscosity of $\leq 3,000$ Pa·s when measured using any shear rate in the range of from $0.9\pm0.05$ to $90\pm5$ s⁻¹, and an equilibrium viscosity of ≦1,500 Pa·s when measured using any shear rate in the range of from 9±0.5 to 90±5 s⁻¹, at any solids content when drying in the range of from 20 to 55% by weight of the composition and at 23±2° C.

More preferably, the composition of the invention has an equilibrium viscosity of ≦3,000 Pa·s when measured using any shear rate in the range of from 0.09±0.005 to 90±5 s⁻¹, and an equilibrium viscosity of ≦1,500 Pa·s when measured using any shear rate in the range of from 0.9±0.05 to 90±6 s⁻¹, and an equilibrium viscosity of ≦500 Pa·s when measured using any shear rate in the range of from 9±0.5 to 90±5 s⁻¹, at any solids content when drying in the range of from 20 to 55% by weight of the composition and at 23±±2° C.

Even more preferably, the composition of the invention has an equilibrium viscosity of ≦1,500 Pa·s when measured using any shear rate in the range of from 0.09±0.005 to 90±5 s⁻¹, and an equilibrium viscosity of ≦200 Pa·s when measured using any shear rate in the range of from 0.9±0.05 to 90±5 s⁻¹, and an equilibrium viscosity of ≦100 Pa·s when measured using any shear rate in the range of from 9±0.5 to 90±5 s⁻¹, at any solids content when drying in the range of from 20 to 55% by weight of the composition and at 23±2° C.

Preferably the solids content of the aqueous coating composition when determining the equilibrium viscosity is in the range of from 20 to 60%, more preferably in the range of from 20 to 70%, and especially in the range of from 20 to 80% by weight of the composition.

Preferably the equilibrium viscosity of the composition of the invention is ≦5000 Pa·s, more preferably ≦3000 Pa·s when measured using any shear range in the range of from 0.9±0.05 to 90±5 s⁻¹, more preferably using any shear rate in the range of from 0.09±0.005 to 90±5 s⁻¹; after a 12%, preferably a 15% and most preferably an 18% increase in the solids content by weight of the composition when drying (e.g. a 12% increase means going from a solids content of 35 to 47% by weight of the composition).

In a preferred embodiment of the present invention the non-crosslinkable oligomer(s) has a solution viscosity ≦150 Pa·s, as determined from a 80% by weight solids solution of the non-crosslinkable oligomer(s) in at least one of the solvents selected from the group consisting of N-methylpyrrolidone, n-butylglycol and mixtures thereof, using a shear rate of 90±5 s⁻¹ and at 50±2° C.

A choice of solvents for determining the solution viscosity of the non-crosslinkable oligomer(s) is provided herein because the nature of the non-crosslinkable oligomer(s) may affect its solubility.

Preferably the solution viscosity of the non-crosslinkable oligomer(s) is ≦100 Pa·s, especially ≦50 Pa·s and most especially ≦30 Pa·s when measured as defined above.

Alternatively in this embodiment of the invention, and more preferably, the solution viscosity of the non-crosslinkable oligomer(s) may be measured at 23±2° C., and the non-crosslinkable oligomer(s) may thus also be described as preferably having a solution viscosity ≦250 Pa·s, as determined from a 70% by weight solids solution of the non-crosslinkable oligomer(s) in a solvent mixture consisting of:

i) at least one of the solvents selected from the group consisting of N-methylpyrrolidone, n-butylglycol and mixtures thereof;

ii) water; and iii) N,N-dimethylethanolamine;

where i), ii) and iii) are in weight ratios of 20/7/3 respectively, using a shear rate of 90±5 s⁻¹ and at 23±2° C.

Preferably in the preceding alternative the solution viscosity of the non-crosslinkable oligomer(s) is ≦100 Pa·s, more especially ≦50 Pa·s, still more especially ≦35 Pa·s and most especially ≦20 Pa·s, when measured as defined herein at 23±2° C.

If a mixture of N-methylpyrrolidone (NMP) and n-butylglycol (BG) is used, preferably the ratio of NMP:BG is in the range of from 0.01:99.9 to 99.9:0.01, more preferably the ratio of NMP:BG is in the range of from 0.01:99.9 to 10:90 and in the range of from 90:10 to 99.9:0.01, and most preferably the ratio of NMP:BG is in the range of from 0.5:99.5 to 5:95 and in the range of from 95:5 to 99.5:0.5.

The non-crosslinkable oligomer(s) may be completely water-soluble or only have partial or low solubility in water. Preferably the non-crosslinkable oligomer(s) only has partial or little solubility in water. If the non-crosslinkable oligomer(s) is only partially or little soluble in water, it preferably has low water solubility in a pH range of from 2 to 10 and is either self-dispersible in water (i.e. dispersible by virtue of a sufficient concentration of selected bound (in-chain, chain-pendant and/or chain-terminal) hydrophilic groups built into the non-crosslinkable oligomer(s), and thus not requiring high shear techniques and/or added surfactants to produce the dispersion, although such methods can also be included if desired), or is only dispersible in water with the aid of added (i.e. external) surface active agents and/or the use of high shear mixing. Low water solubility confers the advantage of a reduced water-sensitivity of the applied coating. Such low water solubility is defined herein as the non-crosslinkable oligomer(s) being less than 70% by weight soluble in water throughout the pH range of from 2 to 10 as determined for example by a centrifuge test as described herein. Preferably the non-crosslinkable oligomer(s) is ≦60%, more preferably ≦50% most preferably ≦30% by weight soluble in water throughout the pH range of from 2 to 10. The non-crosslinkable oligomer(s) preferably contains a sufficient concentration of bound hydrophilic water-dispersing groups capable of rendering the oligomer(s) self-water-dispersible, but the concentration of such groups is preferably not so great that the oligomer(s) has an unacceptably high water solubility in order to not compromise the water sensitivity of the final coating.

The type of hydrophilic groups capable of rendering the non-crosslinkable oligomer(s) self-water-dispersible are well known in the art, and can be ionic water-dispersing groups or non-ionic water-dispersing groups. Preferred non-ionic water-dispersing groups are polyalkylene oxide groups, more preferably polyethylene oxide groups. A small segment of the polyethylene oxide group can be replaced by propylene oxide segment(s) and/or butylene oxide segment(s), however the polyethylene oxide group should still contain ethylene oxide as a major component. When the water-dispersible group is polyethylene oxide, the ethylene oxide group preferably has a Mw from 175 to 5000 Daltons, more preferably from 350 to 2200 Daltons, most preferably from 660 to 1100 Daltons. Preferably the non-crosslinkable oligomer(s) has a polyethylene oxide content of 0 to 50% by weight, more preferably 0 to 39% by weight and most preferably 2 to 35% by weight.

Preferred ionic water-dispersing groups are anionic water-dispersing groups, especially carboxylic, phosphoric and or sulphonic acid groups. The anionic water-dispersing groups are preferably fully or partially in the form of a salt. Conversion to the salt form is optionally effected by neutralisation of the non-crosslinkable oligomer(s) with a base, preferably during the preparation of the non-crosslinkable oligomer(s) and/or during the preparation of the composition of the present invention. The anionic dispersing groups may in some cases be provided by the use of a monomer having an already neutralised acid group in the non-crosslinkable oligomer(s) synthesis so that subsequent neutralisation is unnecessary. If anionic water-dispersing groups are used in combination with non-ionic water-dispersing groups, neutralisation may not be required.

If the anionic water-dispersing groups are neutralised, the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives counter ions that may be desired for the composition. For example, preferred counter ions include $Li^+$, $Na^+$, $K^+$, $NH_4^+$ and substituted ammonium salts.

Cationic water dispersible groups can also be used, but are less preferred. Examples include pyridine groups, imidazole groups and or quaternary ammonium groups which may be neutralised or permanently ionised (for example with dimethylsulphate).

The non-crosslinkable oligomer(s) may be dispersed in water using techniques well known in the art. Preferably, the non-crosslinkable oligomer(s) is added to the water with agitation or, alternatively, water may be stirred into the non-crosslinkable oligomer(s).

Surfactants and/or high shear can be utilised in order to assist in the dispersion of the non-crosslinkable, water-dispersible oligomer(s) in water (even if it is self-dispersible). Suitable surfactants include but are not limited to conventional anionic, cationic and/or non-ionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The amount of surfactant used is preferably 0 to 15% by weight, more preferably 0 to 8% by weight, still more preferably 0 to 5% by weight, especially 0.1 to 3% by weight, and most especially 0.3 to 2% by weight based on the weight of the non-crosslinkable oligomer(s).

The non-crosslinkable oligomer(s) preferably has a measured weight average molecular weight (Mw) in the range of from 1000 to 80,000 Daltons and more preferably in the range of from 1500 to 50,000 Daltons. If a branched non-crosslinkable oligomer(s) is used, higher molecular weight limits are preferred as branched structures tend to give a lower viscosity than a linear structure for any given Mw. For the purpose of this invention any molecular species with a molecular weight <1000 Daltons is classified as either a reactive diluent or a plasticiser and is therefore not taken into account for the determination of Mn, Mw or PDi. Plasticisers are defined as liquid compounds with a molecular weight of 200 to 1000 g/mole.

Preferably the amount of plasticiser % by weight based on the solids content of the composition is $\leq 15$ wt %, preferably $\leq 8$ wt %, more preferably $\leq 3$ wt % and most preferably 0 wt %.

The molecular weight distribution (MWD) of the non-crosslinkable oligomer(s) has an influence on the equilibrium viscosity of the aqueous composition of the invention, and hence an influence on the open time. MWD is conventionally described by the polydispersity index (PDi). PDi is defined as the weight average molecular weight divided by the number average molecular weight (Mw/Mn) where lower values are equivalent to lower PDi's. It has been found that a lower PDi often results in lower viscosities for a given Mw non-crosslinkable oligomer(s). Preferably the value of PDi of the non-crosslinkable oligomer(s) is $\leq 15$, more preferably $\leq 10$, and most preferably $\leq 5$. In a preferred embodiment the value of $Mw \times PDi^{0.8}$ of the non-crosslinkable oligomer(s) is $\leq 220,000$, more preferably the $Mw \times PDi^{0.8}$ is $\leq 100,000$ and most preferably the $Mw \times PDi^{0.8}$ is $\leq 50,000$.

The non-crosslinkable oligomer(s) preferably has an acid value of in the range of from 0 to 80 mg KOH/g, more preferably in the range of from 0 to 35 mgKOH/g, still more preferably in the range of from 0 to 30 mg KOH/g and most preferably in the range of from 2 to 30 mg KOH/g.

The glass transition temperature (Tg) of the non-crosslinkable oligomer(s) may vary within a wide range. The Tg (as measured by modulated DSC) is preferably in the range of from $-120$ to $250°$ C., more preferably in the range of from $-120$ to $100°$ C., still more preferably in the range of from $-70$ to $70°$ C., especially in the range of from $-50$ to $20°$ C.

The non-crosslinkable oligomer(s) may comprise a single non-crosslinkable oligomer or a mixture of non-crosslinkable oligomers. Non-crosslinkable oligomer(s) include but are not limited to for example polyurethane oligomer(s), vinyl oligomer(s), polyamide oligomer(s), polyether oligomer(s), polysiloxane oligomer(s) and/or polyester oligomer(s) and the non-crosslinkable oligomer(s) may optionally be branched (such branched oligomer(s) may also be known as hyperbranched macromolecule(s)).

Preferably the composition of the invention comprises no substantial amount of a crosslinkable oligomer(s), most preferably the composition of the invention comprises 0 to <0.4 wt % of a crosslinkable oligomer(s), provided that the crosslinkable oligomer(s) has a solution viscosity and/or a Mw within the preferred ranges defined above for the non-crosslinkable oligomer(s).

The water-dispersible non-crosslinkable oligomer(s), if a polyurethane oligomer(s), may be prepared in a conventional manner by reacting an organic polyisocyanate with an isocyanate reactive compound.

Methods for preparing polyurethanes are known in the art and are described in for example the Polyurethane Handbook $2^{nd}$ Edition, a Carl Hanser publication, 1994, by G. Oertel; and these methods are included herein by reference. Isocyanate-reactive groups include —OH, —SH, —NH—, and —$NH_2$. In some preparations, an isocyanate-terminated polyurethane prepolymer is first formed which is then chain extended with an active hydrogen containing compound.

Suitable polyisocyanates include aliphatic, cycloaliphatic, araliphatic and/or aromatic polyisocyanates. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, α,α'-tetramethylxylene diisocyanate, 1,4-phenylene diisocyanate, 2,4-toluene diisocyanate, 2,6-toluene diisocyanate, 4,4'-diphenylmethane diisocyanate, polymethylene polyphenyl polyisocyanates, 2,4'-diphenylmethane diisocyanate, 3(4)-isocyanatomethyl-1-methyl cyclohexyl isocyanate and 1,5-naphthylene diisocyanate. Mixtures of polyisocyanates can be used and also polyisocyanates which have been modified by the introduction of urethane, allophanate, urea, biuret, carbodiimide, uretonimine, urethdione or isocyanurate residues.

Hydrophilic water-dispersing groups, if present, are preferably introduced by employing as a reactant(s) in the urethane synthesis at least one isocyanate-reactive compound (or less preferably an isocyanate-functional compound(s)) bearing a non-ionic and/or ionic hydrophilic water-dispersing group(s) (as described above) (or group which may be subsequently easily converted to such a water-dispersing group, e.g. by neutralisation, such a group still being termed a water-dispersing group for the purposes of this invention) as a reactant in the preparation of the polyurethane oligomer or prepolymer. Examples of such compounds include carboxyl group containing diols and triols, for example dihydroxy alkanoic acids such as 2,2-dimethylolpropionic acid or 2,2-dimethylolbutanoic acid. Examples of preferred compounds bearing non-ionic hydrophilic water-dispersing groups include methoxy polyethylene glycol (MPEG) with molecular weights of for example 350, 550, 750, 1000 and 2000, as described in EP 0317258.

Other isocyanate-reactive organic compounds bearing no hydrophilic water-dispersing groups which may be used in the preparation of non-crosslinkable polyurethane oligomer (s) or polyurethane prepolymers preferably contain at least one (preferably at least two) isocyanate-reactive groups, and are more preferably organic polyols. The organic polyols particularly include diols and triols and mixtures thereof but higher functionality polyols may be used, for example as minor components in admixture with diols. The polyols may be members of any of the chemical classes of polyols used or proposed to be used in polyurethane formulations. In particular the polyols may be polyesters, polyesteramides, polyethers, polythioethers, polycarbonates, polyacetals, polyolefins or polysiloxanes. Preferred polyol molecular weights are from 250 to 6000, more preferably from 500 to 3000. Low molecular weight organic compounds containing at least one (preferably at least two) isocyanate-reactive groups and having a weight average molecular weight up to 500, preferably in the range of 40 to 250 can also be used. Examples include ethyleneglycol, neopentyl glycol, 1-propanol, and 1,4-cyclohexyldimethanol.

When an isocyanate-terminated polyurethane prepolymer is prepared, it is conventionally formed by reacting a stoichiometric excess of the organic polyisocyanate with the isocyanate-reactive compounds under substantially anhydrous conditions at a temperature between about 30° C. and about 130° C. until reaction between the isocyanate groups and the isocyanate-reactive groups is substantially complete; the reactants for the prepolymer are generally used in proportions corresponding to a ratio of isocyanate groups to isocyanate-reactive groups of from about 1.1:1 to about 6:1, preferably from about 1.5:1 to 3:1.

Alternatively a hydroxyl-terminated non-crosslinkable polyurethane oligomer(s) may be prepared directly by reacting the reactants in proportions corresponding to a ratio of isocyanate groups to isocyanate-reactive groups of from about 0.4:1 to about 0.99:1, preferably from about 0.55:1 to 0.95:1.

A non-crosslinkable polyurethane oligomer(s) of acceptably low Mw may be made by capping an isocyanate-terminated polyurethane oligomer(s) with a monofunctional isocyanate-reactive compound or by using a stoichiometric excess of reactant(s) having isocyanate-reactive groups during the oligomer preparation, thereby forming an isocyanate-reactive group (preferably —OH) terminated non-crosslinkable polyurethane oligomer. A combination of both techniques may be used.

If desired, catalysts such as dibutyltin dilaurate and stannous octoate, zirconium or titanium based catalysts may be used to assist the non-crosslinkable polyurethane oligomer(s) formation. An organic solvent may optionally be added before or after prepolymer or final oligomer formation to control the viscosity. Examples of solvents include water-miscible solvents such as N-methylpyrrolidone, dimethyl acetamide, glycol ethers such as butyidiglycol, 2-propanone and alkyl ethers of glycol acetates or mixtures thereof. Optionally no organic solvents are added.

An aqueous non-crosslinkable polyurethane oligomer(s) dispersion may also be prepared, when the prepolymer/chain extension route was employed, by dispersing the isocyanate-terminated polyurethane prepolymer (optionally carried in an organic solvent medium) in an aqueous medium and chain extending the prepolymer with active hydrogen-containing chain extender in the aqueous phase.

Active hydrogen-containing chain extenders which may be reacted with the isocyanate-terminated polyurethane prepolymer include amino-alcohols, primary or secondary diamines or polyamines, hydrazine, and substituted hydrazines.

Examples of such chain extenders useful herein include alkylene diamines such as ethylene diamine and cyclic amines such as isophorone diamine. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulphonic acids such as adipic acid mono- or dihydrazide, oxalic acid dihydrazide, isophthalic acid dihydrazide, hydrazides made by reacting lactones with hydrazine such as gammahydroxylbutyric hydrazide, bis-semi-carbazide, and bis-hydrazide carbonic esters of glycols may be useful. Water itself may be effective as an indirect chain extender.

Where the chain extender is other than water, for example a polyamine or hydrazine, it may be added to the aqueous dispersion of the isocyanate-terminated polyurethane prepolymer or, alternatively, it may already be present in the aqueous medium when the isocyanate-terminated polyurethane prepolymer is dispersed therein.

Optionally a combination of chain extender(s) and chain terminator(s) may be used. Examples of chain terminators are mono-functional isocyanate-reactive compounds such as mono-alcohols, mono-amines, mono-hydrazines and mono-mercaptanes. The ratio of chain extender to chain terminator compounds is preferably in the range of from 95:5 to 5:95, more preferably 50:50 to 10:90 and most preferably 35:65 to 20:80.

The chain extension and/or chain termination can be conducted at elevated, reduced or ambient temperatures. Convenient temperatures are from about 5° C. to 95° C. or, more preferably, from about 10° C. to 60° C.

The total amount of chain extender and chain terminating materials employed (apart from water) should be such that the ratio of active hydrogens in the chain extender(s) to isocyanate groups in the polyurethane prepolymer preferably is in the range from 0.1:1 to 2.0:1 more preferably 0.8:1 to 1.7:1.

Any other known methods for preparing polyurethane dispersions such as a ketamine/ketazine process or a hot process as described in "Progress in Organic Coatings", D. Dietrich, 9, 1981, p 281) may also be utilised.

The non-crosslinkable polyurethane oligomer(s) has preferably has a measured weight average molecular weight (Mw) in the range of from 1500 to 60,000 Daltons, more preferably in the range of from 2,500 to 40,000 Daltons, and most preferably in the range of from 5,000 to 25,000 Daltons.

Preferably the non-crosslinkable polyurethane oligomer(s) has a polyethylene oxide content of 0 to 45% by weight, more preferably 0 to 25% by weight and most preferably 2 to 15% by weight.

The non-crosslinkable polyurethane oligomer(s) preferably has at least one glass transition temperature (Tg) in the range of from −100 to 250° C., more preferably −80 to 50° C. and most preferably −70 to 10° C. and especially −50 to 0° C.

The non-crosslinkable polyurethane oligomer(s) preferably has an acid value in the range of from 0 to 50 mg KOH/g, more preferably in the range of from 0 to 40 mg KOH/g and most preferably in the range of from 10 to 30 mg KOH/g.

The non-crosslinkable water-dispersible oligomer(s) if a polyester oligomer(s) can be prepared using conventional polymerisation procedures known to be effective for polyester synthesis. General processes for the preparation of polyesters are described in "Alkyd Resin Technology" by T C Patton, Publisher John Wiley & sons Inc. (1962). It is known that polyesters, which contain carbonyloxy (i.e. —C(=O)—O—) linking groups may be prepared by a condensation polymerisation process in which monomer(s) providing an "acid component" (including ester-forming derivatives thereof) is reacted with monomer(s) providing a "hydroxyl component". The monomer(s) providing an acid component may be selected from one or more polybasic carboxylic acids such as di- or tri-carboxylic acids or ester-forming derivatives thereof such as add halides, anhydrides or esters. The monomer(s) providing a hydroxyl component may be one or more polyhydric alcohols or phenols (polyols) such as diols, triols, etc. Mono-functional acid and hydroxy components may also be included in the preparation of the non-crosslinkable polyester oligomer(s). (It is to be understood, however, that the non-crosslinkable polyester oligomer(s) may contain, if desired, a proportion of carbonylamino linking groups —C(=O)—NH— (i.e. amide linking group) by including an appropriate amino functional reactant as part of the "hydroxyl component" or alternatively all of the hydroxyl component may comprise amino functional reactants, thus resulting in a polyamide oligomer; such amide linkages are in fact useful in that they are more hydrolysis resistant).

There are many examples of carboxylic acids (or their ester forming derivatives) which can be used in non-crosslinkable polyester oligomer(s) synthesis for the provision of the monomer(s) providing an acid component. Examples include, but are not limited to $C_2$ to $C_{22}$ monocarboxylic acids such as (alkylated) benzoic acid and hexanoic acid; and $C_4$ to $C_{20}$ aliphatic, alicyclic and aromatic dicarboxylic acids (or higher functionality acids) or their ester-forming derivatives (such as anhydrides, acid chlorides, or lower alkyl esters). Specific examples include adipic acid, fumaric acid, maleic acid, succinic acid, itaconic acid, azeleic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, fatty acid dimers, isophthalic acid, 5-sodiosulpho isophthalic acid, phthalic acid and tetrahydrophthalic acid. Anhydrides include succinic, maleic, phthalic, trimellitic and hexahydrophthalic anhydrides.

Similarly there are many examples of polyols which may be used in non-crosslinkable polyester oligomer(s) synthesis for the provision of the monomer(s) providing a hydroxyl component. The polyol(s) preferably have from 1 to 6 (more preferably 2 to 4) hydroxyl groups per molecule. Suitable monofunctional alcohols include for example eicosanol and lauryl alcohol. Suitable polyols with two hydroxy groups per molecule include diols such as 1,2-ethanediol, 1,3-propanediol, 1,4-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols with three hydroxy groups per molecule include triols such as trimethylolpropane (TMP) and 1,1,1-tris(hydroxymethyl) ethane (TME). Suitable polyols with four or more hydroxy groups per molecule include bis-TMP, pentaerythritol (2,2-bis(hydroxymethyl)-1,3-propanediol), bis-pentaerythritol and sorbitol (1,2,3,4,5,6-hexahydroxyhexane).

Suitable compounds bearing non-ionic hydrophilic water dispersing groups include for example ethylene oxide-containing hydroxy functional compounds such as alkoxypolyethylene glycols and polyethylene glycols. Preferably the hydrophilic water-dispersing groups are carboxylic acid groups, sulphonic acid groups or sulphonate anion groups (neutralisation of the sulphonic acid groups preferably already having been effected. Preferably incorporation of carboxylic acid groups can occur by having a residual carboxylic acid functionality, post functionalisation of hydroxy-functionalised polyester oligomer(s) or use of sterically hindered hydroxy functional acids such as dimethylolpropionic acid. Preferably, the sulphonic acid or sulphonate anion containing monomer is a dicarboxylic acid monomer having at least one sulphonic acid salt group substituent. Alternatively, alkyl ester groups may be used in place of the carboxylic acid groups. Such a monomer will therefore be part of the acid component used in the polyester synthesis. Examples of such compounds are the alkali metal salts of sulphonic acid substituted aromatic dicarboxylic acids, for example alkali metal salts of 5-sulpho-1,3-benzene dicarboxylic acid. Particularly preferred is sodio-5-sulphoisophthalic acid (SSIPA). Other useful sulphonic acid containing monomers are the alkali metal salts of sulphonic acid substituted aromatic dicarboxylic acid-dihydroxyalkylesters such as the alkali metal salts of 5-sulpho-1,3-benzenedicarboxylic acid-1,3-bis(2-hydroxyethyl)ester.

Preferably the ionic sulphonate water-dispersing group content of the non-crosslinkable polyester oligomer(s) is in the range of from 7.5 to 100 milliequivalents of ionic water-dispersing groups per 100 g of non-crosslinkable polyester oligomer(s), more preferably from 10 to 75 milliequivalents per 100 g. Preferably the acid value of the non-crosslinkable polyester oligomer(s) is in the range of from 0 to 80 mgKOH/g, more preferably in the range of from 1 to 40 mgKOH/g, and especially in the range of from 3 to 25 mgKOH/g.

Preferably the non-crosslinkable polyester oligomer(s) has a polyethylene oxide content of 0 to 50% by weight, more preferably 0 to 45% by weight, still more preferably 0 to 38% by weight, especially 3 to 35% by weight and most preferably 5 to 25% by weight. The non-crosslinkable polyester oligomer(s) preferably has a weight average molecular weight (Mw) in the range of from 1500 to 80,000 Daltons, more preferably in the range of from 2000 to 65,000 Daltons, most preferably in the range of from 3,500 to 50,000 Daltons, and especially in the range of from 5000 to 40,000 Daltons.

Preferably the non-crosslinkable polyester oligomer(s) has a Tg in the range of from −90 to 100° C., more preferably in the range of from −70 to 40° C. and most preferably in the range of from −60 to 20° C.

An organic solvent may optionally be added before or after the polymerisation process to control the viscosity.

The esterification polymerisation processes for making the non-crosslinkable polyester oligomer(s) for use in the invention composition are well known in the art and need not be described here in detail. Suffice to say that they are normally carried out in the melt using catalysts such as tin-based catalysts and with the provision for removing any water (or alcohol) formed from the condensation reaction.

The non-crosslinkable polyester oligomer(s) may be dispersed in water using techniques well known in the art. An aqueous dispersion of the non-crosslinkable polyester oligomer(s) may be readily prepared by adding water directly to the hot non-crosslinkable polyester oligomer(s) melt until the desired solids content/viscosity is reached. Alternatively the non-crosslinkable polyester oligomer(s) may be dispersed in water by adding an aqueous pre-dispersion (or organic solvent solution) of the polyester oligomer(s) to the water phase. Still further an aqueous dispersion may be prepared by dispersion of the solidified melt from the condensation polymerisation directly into water. The solidified melt is preferably in a form such as flake (which can often be obtained directly from the melt) or comminuted solid (obtained for example by grinding).

The non-crosslinkable, water-dissipatable oligomer(s) if a vinyl oligomer(s) is usually derived from free radically polymerisable olefinically unsaturated monomer(s), and can contain polymerised units of a wide range of such monomers, especially those commonly used to make binders for the coatings industry. By a vinyl oligomer herein is meant a homo- or co-oligomer derived from the addition polymerisation (using a free radical initiated process which may be carried out in an aqueous or non-aqueous medium) of one or more olefinically unsaturated monomers. Therefore by a vinyl monomer is meant an olefinically unsaturated monomer.

A particularly preferred non-crosslinkable vinyl oligomer(s) is an acrylic oligomer(s) (i.e. based predominantly on at least one ester of acrylic or methacrylic acid).

Examples of vinyl monomers which may be used to form a non-crosslinkable vinyl oligomer include but are not limited to 1,3-butadiene, isoprene, styrene, α-methyl styrene, divinyl benzene, acrylonitrile, methacrylonitrile, vinyl halides such as vinyl chloride, vinylidene halides such as vinylidene chloride, vinyl ethers, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula

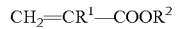

$CH_2=CR^1-COOR^2$ wherein $R^1$ is H or methyl and $R^2$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethyl methacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Union Carbide Corporation).

Particularly preferred is a non-crosslinkable vinyl oligomer made from a monomer system comprising at least 40 weight % of one or more monomers of the formula $CH_2=CR^1COOR^2$ as defined above. Such a preferred non-crosslinkable vinyl oligomer is defined herein as a non-crosslinkable acrylic oligomer. More preferably, the monomer system contains at least 50 wt. % of such monomers, and particularly at least 60 wt. %. The other monomer(s) in such acrylic oligomer(s) (if used) may include one or more of the other vinyl monomers mentioned above, and/or may include ones different to such other monomers. Particularly preferred monomers include butyl acrylate (all isomers), butyl methacrylate, methyl methacrylate, ethyl hexyl methacrylate, esters of (meth)acrylic acid, acrylonitrile, vinyl acetate and styrene.

The hydrophilic water-dispersing groups may be introduced by for example i) utilising in the synthesis of the non-crosslinkable vinyl oligomer(s) a vinyl monomer which carries a hydrophilic water-dispersing group (for example an olefinically unsaturated monocarboxylic, sulphonic and/or dicarboxylic acid, such as acrylic acid, methacrylic acid, carboxy ethylacrylate, fumaric acid or itaconic acid, an amide such as (meth)acrylamide, or a polyethyleneoxide containing (meth)acrylate monomer such as methoxy(polyethyleneoxide (meth)acrylate) or a hydroxyalkyl(meth)acrylate like hydroxyethyl(meth)acrylate HE(M)A, or alternatively ii) utilising a precursor vinyl oligomer bearing selective reactive groups which is subsequently reacted with a compound carrying a water-dispersing group to provide attachment of the water-dispersing group to the oligomer via covalent bonding.

The non-crosslinkable vinyl oligomer(s) is preferably prepared by free radical polymerisation, although in some circumstances anionic polymerisation may be utilised. The free radical polymerisation can be performed by techniques known in the art, for example by emulsion polymerisation, solution polymerisation, suspension polymerisation or bulk polymerisation.

A free-radical polymerisation of vinyl monomer(s) to form a non-crosslinkable vinyl oligomer(s) will require the use of a free-radical-yielding initiator(s) to initiate the vinyl monomer polymerisation. Suitable free-radical-yielding initiators include inorganic peroxides such as K, Na or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, and iso-ascorbic acid. Azo compounds such as azoisobutyronitrile may also be used. Metal compounds such Fe.EDTA (EDTA is ethylene diamine tetracetic acid) may also be usefully employed as part of the redox initiator system. It is possible to use an initiator system partitioning between the aqueous and organic phases, e.g. a combination of t-butyl hydroperoxide, iso-ascorbic acid and Fe.EDTA. The amount of initiator or initiator system to use is conventional, e.g. within the range 0.05 to 6 wt. % based on the total vinyl monomer(s) used.

As stated above, a preferred feature of the invention is a low solution viscosity for the vinyl oligomer(s) (as defined) which may be obtained by controlling the molecular weight and/or the MWD of the non-crosslinkable vinyl oligomer(s).

It may be desirable to control the molecular weight by addition of a chain transfer agent to the free radical polymerisation process. Conventional chain transfer agents may be utilised and include mercaptans, sulphides, disulphides, triethylamine and halocarbons. In particular however the technique known as catalytic chain transfer polymerisation (CCTP) may be used to provide low molecular weights. In this case a free radical polymerisation is carried out using a free radical forming initiator and a catalytic amount of a selected transition metal complex acting as a catalytic chain transfer agent (CCTA), and in particular a selected cobalt chelate complex. Such a technique has been described for example in N. S. Enikolopyan et al, J. Polym. Chem. Ed., Vol 19, 879 (1981), U.S. Pat. No. 4,526,945, U.S. Pat. No. 4,680,354, EP-A-0196783, EP-A-0199436, EP-A-0788518 and WO-A-87/03605.

The use of catalytic chain transfer agents provide important benefits such as such as a) very low concentrations of catalytic chain transfer agent (typically 1 to 1000 ppm by weight of vinyl monomer used) are required to attain the preferred low molecular weight oligomer and do not have the odour often associated with conventional chain transfer agents;

b) CCTP allows the preparation of a vinyl oligomer(s) which has a narrower PDi than is achievable by the use of conventional chain transfer agents for low Mw oligomer(s). As discussed above, low PDi favours low viscosity in the bulk and in solution (for a given Mw), which in turn leads to longer open time and wet edge time.

The non-crosslinkable vinyl oligomer(s) of the composition of the invention preferably has an acid value of in the range of from 0 to 80 mg KOH/g, more preferably in the range of from 0 to 30 mg KOH/g most preferably in the range of from 5 to 15 mg KOH/g.

The glass transition temperature (Tg) of the non-crosslinkable vinyl oligomer(s) is preferably in the range of from −90 to 120° C., more preferably in the range of from −70 to 60° C. Particularly preferred is that the Tg of the non-crosslinkable vinyl oligomer(s) is in the range of from −60 to 30° C., more preferably in the range of from −50 to 0° C.

Preferably the non-crosslinkable vinyl oligomer(s) has a polyethylene oxide content of 0 to 45% by weight, more preferably 0 to 30% by weight and still more preferably 2 to 20% by weight and especially 3 to 15% by weight.

The non-crosslinkable vinyl oligomer(s) preferably has a weight average molecular weight (Mw) in the range of from 2,000 to 80,000 Daltons, more preferably in the range of from 3,000 to 50,000 Daltons, still more preferably in the range of from 4000 to 30,000 Daltons, and most preferably in the range of from 5,000 to 25,000 Daltons.

The non-crosslinkable, water-dispersible oligomer(s) if a hyperbranched macromolecule(s) may be prepared by controlled step-growth (condensation) polymerisation and uncontrolled chain-growth (addition) polymerisation. Methods for preparing hyperbranched or dendritic molecules are known in the art and are described in for example in Tomalia et al (Angewandte Chemie International Edition English, 1990, Vol 29, pp 138–175) and the Encyclopaedia of Polymer Science and Engineering, Volume Index 1990, pp 46–92. Methods for preparing hyperbranched macromolecule(s) are also reviewed in U.S. Pat. No. 5,418,301, U.S. Pat. No. 5,663,247, WO 96/19537, WO 96/13558, U.S. Pat. No. 5,270,402, U.S. Pat. No. 5,136,014, U.S. Pat. No. 5,183,862, WO 93/18079, U.S. Pat. No. 5,266,106 and U.S. Pat. No. 5,834,118 and these methods are included herein by reference.

The non-crosslinkable hyperbranched macromolecule(s) are often derived from a nucleus (or core molecule) having one or more reactive groups to which successive groups of branching and/or chain-extender molecules having at least two reactive groups are added to form branches. Each successive group of branching and/or chain-extender molecules is normally known as a generation. The branches may then be chain-terminated by adding a chain-terminator molecule(s) having one reactive group that is reactive towards a reactive group on the branch. Alternatively the branches can be made first and linked together afterwards to give the hyperbranched macromolecule(s).

When preparing non-crosslinkable hyperbranched macromolecule(s) some defects are possible and these include inter-macromolecule defects and intra-macromolecule defects such as bridging or looping. Intra-macromolecule defects decrease branching symmetry and inter-macromolecule defects lead to more polydisperse systems. These events may be minimised or eliminated if desired by process optimisation and synthetic strategy optimisation.

The size, shape and properties of hyperbranched macromolecule(s) can be controlled by the choice of the core molecule, the number of generations, the degree of branching and the choice and amount of chain-extender and chain-terminator molecules employed.

The core molecule may affect the hyperbranched macromolecule(s) shape, producing for example spheroid-, comb-cylindrical- or ellipsoid-shaped hyperbranched macromolecule(s). The sequential building of generations determines the nature, function and dimensions of the hyperbranched macromolecule(s).

Examples of core molecules include but are not limited to molecules having one or more carboxylic acid groups (including monofunctional carboxylic acids having at least two hydroxyl groups such as dimethylolpropionic acid), amine groups (including ammonia, polyfunctional amines, such as ethylene diamine, linear and/or branched polyethyleneimines), halide groups, hydroxyl groups (including mono- and polyfunctional alcohols such as pentaerythritol, dipentaerythritol, alkyl glucosides, neopentyl glycol, tris(hydroxymethyl)ethane, trimethylolpropane (TMP), bis-TMP, sorbitol, mannitol, sacharides, sugar alcohols, 1,1,1-tris-(4'-hydroxyphenyl)-ethane, 3,5-dihydroxy-benzyl alcohol) or epoxide groups.

Examples of chain-extender molecules include but are not limited to diisocyanates, diethylene diimine, diols, and carboxylic anhydrides. Examples of branching molecules include but are not limited to, for example, 3,5-dihydroxy-benzyl alcohol; monofunctional carboxylic acids having at least two hydroxyl groups, such as dimethylolpropionic acid, and dimethylolbutanoic acid, hydroxy functional diacids (or their esters) such as aspartate esters, 5-hydroxy-isophthalic acid, but may also be indirectly obtained, for example through two Michael additions of an acrylate ester or acrylonitrile to one primary amine functional group, or through reaction of a carboxylic acid functional anhydride such as trimellitic anhydride (TMA) with an OH functional group, which results in a diacid functional group. Preferably, the reactive groups within each of the chain-extender and branching molecules have a different reactivity to reduce the amount of crosslinking during synthesis between the individual hyperbranched molecules, i.e. to control the polydispersity.

Examples of chain-terminator molecules include but are not limited to mono-functional molecules (or oligomers) carrying for example epoxide, isocyanate, hydroxyl, thiol, carboxylate, carboxylic anhydride, ester, amides, phosphates, amino, sulphonate and carboxylic acid groups (such as benzoic acid and (meth)acrylic acid, which react with the reactive groups on the periphery of the hyperbranched macromolecule(s).

The chain-extender and or chain-terminator molecules may carry hydrophilic water-dispersing groups which may be introduced directly in the non-crosslinkable hyperbranched macromolecule(s) by condensation polymerisation, or alternatively hydrophilic water-dispersing groups may be reacted onto the non-crosslinkable hyperbranched macromolecule(s) by any known technique.

Suitable reactive groups of the molecules used in the preparation of non-crosslinkable hyperbranched macromolecule(s) usually include but are not limited to hydroxyl, carboxylic acid, epoxide, amine, allyl, acryloyl, carboxylic esters, carboxylic anhydrides, silanes, nitriles (which after reduction give amines) and oxazolines.

Hydrophilic water-dispersing groups may be introduced into the non-crosslinkable hyperbranched macromolecule(s) using two general methods: i) by utilising in the polymerisation process to form a hyperbranched macromolecule(s), a branching molecule, a chain-extender molecule and/or chain-terminator molecule carrying hydrophilic water-dispersing groups; and ii) utilising a molecule chain-extender and/or chain-terminator molecule bearing selected reactive groups and which molecule is subsequently reacted with a molecule carrying a hydrophilic water-dispersing groups and also a reactive group of the type which will react with the selected reactive groups on the non-crosslinkable hyperbranched macromolecule(s) to provide attachment of the hydrophilic water-dispersing groups to the non-crosslinkable hyperbranched macromolecule(s) via covalent bonding.

The non-crosslinkable hyperbranched macromolecule(s) preferably has an acid value of in the range of from 0 to 80 mg KOH/g, more preferably in the range of from 0 to 50 mg KOH/g, still more preferably in the range of from 1 to 30 mg KOH/g and most especially in the range of from 3 to 15 mg KOH/g.

Preferably the non-crosslinkable hyperbranched macromolecule(s) has a polyethylene oxide content of 0 to 50% by weight, most preferably 3 to 42% by weight, especially 7 to 38% by weight and most especially 12 to 35% by weight.

Preferably the non-crosslinkable hyperbranched macromolecule(s) has a weight average molecular weight (Mw) in the range of from 1500 to 80,000 Daltons, more preferably in the range of from 2000 to 70,000 Daltons, most preferably in the range of from 3000 to 60,000 Daltons, and especially in the range of from 5000 to 50,000 Daltons.

The glass transition temperature of the non-crosslinkable hyperbranched macromolecule(s) is preferably in the range of from −75 to +80° C., more preferably in the range of from −60 to +50° C. and most preferably in the range of from −50 to +20° C.

The aqueous composition of the invention also includes a polymer(s) dispersed therein which is not a non-crosslinkable oligomer(s) and preferably has a Mw $\geq$ 90,000 Daltons, herein termed a "dispersed polymer" for convenience. Preferably the weight average molecular weight of the dispersed polymer(s) Mw in the aqueous polymer dispersion is in the range of from 90,000 to 6,000,000, more preferably in the range of from 150,000 to 2,000,000, and especially in the range of from 250,000 to 1,500,000 Daltons. If the dispersed polymer(s) is fully precrosslinked its Mw will be infinite. Also, in some cases, the synthesis to form the non-crosslinkable oligomer(s) yields, in addition to the low molecular weight oligomer, an amount of very high molecular weight material. For the purposes of this invention, such very high molecular weight material, produced in-situ, is to be considered as a dispersed polymer.

The Mw of the dispersed polymer(s) may be <90,000 Daltons, with the proviso that the solution viscosity of the dispersed polymer(s) is at least 150 Pa·s as determined from a 80% by weight solids solution of the dispersed polymer(s) in at least one of the solvents selected from the group consisting of N-methylpyrrolidone, n-butylglycol and mixtures thereof using a shear rate of 90±5 s$^{-1}$ and at 50±2° C.

Preferably the solution viscosity (if measurable) of the dispersed polymer(s) when used in the aqueous composition of the invention is $\geq$250 Pa·s, more preferably $\geq$500 Pa·s, and especially $\geq$1000 Pa·s as determined from a 80% by weight solids solution of the dispersed polymer(s) in at least one of the solvents selected from the group consisting of N-methylpyrrolidone, n-butylglycol and mixtures thereof using a shear rate of 90±5 s$^{-1}$ and at 50±2° C.

The solution viscosity of the dispersed polymer(s) may not be measurable if for example the weight average molecular weight is so high so as to render the dispersed polymer(s) insoluble in organic solvent(s) or if the dispersed polymer(s) is fully or partially crosslinked, again rendering it insoluble.

The dispersed polymer(s) may be film forming or non-film forming at ambient temperature.

The dispersed polymer(s) may for example be the product of an aqueous emulsion polymerisation or a preformed polymer dispersed in water.

Preferably the dispersed polymer(s) has a measured Tg (using DSC) which is preferably in the range of from −50 to 300° C., and more preferably in the range of from 25 to 200° C. and especially in the range of from 35 to 125° C. If the dispersed polymer(s) is a vinyl polymer, the vinyl polymer may be a sequential polymer, i.e. the vinyl polymer will have more than one Tg. Especially preferred is a vinyl polymer with 10 to 50 wt. % of a soft part with a Tg in the range of from −30 to 20° C. and 50 to 90 wt. % of a hard part of with a Tg in the range of from 60 to 110° C. This combination provides an additional advantage of improved block resistance of the resultant coating, especially when co-solvent levels of 0 to 15 wt. %, more preferably 0 to 5 wt. % and most preferably 0 to 3 wt. %. of the aqueous composition are used. Blocking is the well-known phenomenon of coated substrates which are in contact tending to unacceptably adhere to each other, for examples doors and windows in their respective frames, particularly when under pressure, as for example in stacked panels.

Preferably the dispersed polymer(s) has an average particle size in the range of from 25 to 1000 nm, more preferably 50 to 600 nm, more preferably 100 to 500 nm and especially in the range of from 150 to 450 nm. The dispersed polymer(s) may also have a polymodal particle size distribution.

The dispersed polymer(s) may for example be a vinyl polymer, polyurethane, polyester, polyether, polyamide, polyepoxide, or a mixture thereof. The dispersed polymer(s) may also be a hybrid of two or more different polymer types such as urethane-acrylic polymers (as described in for example U.S. Pat. No. 5,137,961), epoxy-acrylic polymers and polyester-acrylic polymers. The dispersed polymer(s) may also be an organic-inorganic hybrid, for example silica particles grafted with a vinyl polymer(s). Preferably the dispersed polymer(s) is a vinyl polymer. Blends of dispersed polymers may of course also be used.

The dispersed polymer(s) may optionally contain acid groups. The preferred acid value of the dispersed polymer(s) depends on the type and molecular weight of non-crosslinkable oligomer(s) and (if present) the type of cosolvent used. If the non-crosslinkable oligomer(s) is hydrophilic, the cosolvent (if used) is preferably also of a hydrophilic nature and a low acid value of the dispersed polymer(s) is preferred (preferably below 40, more preferably below 30, especially below 24, more especially below 19 and most especially below 15 mg KOH/g). If however a hydrophobic non-crosslinkable oligomer is used, for instance without dispersing groups, the co-solvent is preferentially of a hydrophobic nature (if at all present) and therefore much higher acid values (up to an acid value of 160, more preferably up to an acid value of 125, most preferably up to an acid value of 100 mg KOH/g) of the dispersed polymer(s) may be tolerated to give the desired properties.

The dispersed polymer(s) may optionally contain hydroxyl groups. If the dispersed polymer(s) is a vinyl polymer comprising polymerised (meth)acrylic monomers then preferably the hydroxyl group content in the vinyl polymer is preferably below 1.0 wt. %, more preferably below 0.5 wt. % and most preferably below 0.2 wt. % based on the weight of the vinyl polymer.

The dispersed polymer(s) may optionally contain amide groups (such groups being e.g. obtainable from amide functional monomers such as (meth)acrylamide). If the dispersed polymer(s) is a vinyl polymer comprising polymerised (meth)acrylamide monomers, then preferably the amide group content in the vinyl polymer is below 3.0 is wt. %, more preferably below 1.5 wt. % and most preferably below 0.6 wt. % based on the weight of the vinyl polymer.

The dispersed polymer(s) may optionally contain wet-adhesion promoting groups such as acetoacetoxy groups, (optionally substituted) amine or urea groups, for example cyclic ureido groups, imidazole groups, pyridine groups, hydrazide or semicarbazide groups.

The dispersed polymer(s) may optionally contain crosslinker groups which allow crosslinking of the dispersed polymer(s), thus speeding up the drying rate and improving the properties of the final coating (e.g. chemical resistance and scratch resistance). Examples of such crosslinker groups include groups which can take part in autoxidation and groups which will effect crosslinking other than by autoxidation, for example by Schiff base and silane condensation reactions. The dispersed polymer(s) may crosslink at ambient temperature by a number of mechanisms including but not limited to autoxidation, Schiff base crosslinking and silane condensation. By crosslinking by autoxidation is meant that crosslinking results from an oxidation occurring in the presence of air and usually involves a free radical mechanism and is preferably metal-catalysed resulting in covalent crosslinks. By Schiff base crosslinking is meant that crosslinking takes place by the reaction of a carbonyl functional group(s), where by a carbonyl functional group herein is meant an aldo or keto group and includes an enolic carbonyl group such as is found in an acetoacetyl group with a carbonyl-reactive amine and/or hydrazine (or blocked amine and/or blocked hydrazine) functional group. By silane condensation is meant the reaction of alkoxy silane or —SiOH groups in the presence of water, to give siloxane bonds by the elimination of water and/or alkanols (for example methanol) during the drying of the aqueous coating composition.

Other crosslinking mechanisms known in the art include those provided by the reaction of epoxy groups with amino, carboxylic acid or mercapto groups, the reaction of mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylenediamine or multifunctional amine terminated polyalkylene oxides) with β-diketo (for example acetoacetoxy or acetoamide) groups to form enamines. The use of blocked crosslinker groups may be beneficial. However, crosslinker groups should be chosen with care so as to not result in any crosslinking of any functional groups that may be carried on the non-crosslinkable oligomer(s).

Preferably a significant part of any crosslinking reaction only takes place after application of the aqueous coating composition to a substrate, to avoid an excessive molecular weight build up in the invention composition prior to such application (by precrosslinking) which may lead to impaired film formation and a decrease in water-resistance.

In an embodiment the dispersed polymer(s) may be fully or partially pre-crosslinked (i.e. fully or partially crosslinked while present in the invention aqueous coating composition and prior to applying a coating). Preferably the dispersed polymer(s) is partially pre-crosslinked. If the dispersed polymer(s) is a dispersed vinyl polymer(s) pre-crosslinking may be achieved by using polyunsaturated monomers during the vinyl polymer synthesis such as allyl methacrylate, diallyl phthalate, tripropylene glycol di(meth)acrylate, 1,4-butanediol diacrylate and trimethylol propane triacrylate. Allyl methacrylate is most preferred. Alternatively very low levels of initiator may be used, leading to chain-transfer to the dispersed vinyl polymer(s) and hence to grafting and high Mw. Other ways to generate pre-crosslinking in a dispersed vinyl polymer(s) is to include the use of monomer(s) bearing groups which may react with each other during synthesis to effect pre-crosslinking for example glycidylmethacrylate and acrylic acid.

Examples of vinyl monomers which may be used to form dispersed vinyl polymer(s) include those described above for forming a non-crosslinkable vinyl oligomer(s).

The vinyl monomer may optionally contain functional groups to contribute to the crosslinking of the vinyl polymer(s) in the coating. Examples of such groups include maleic, epoxy, fumaric, acetoacetoxy, β-diketone, unsaturated fatty acid, acryloyl, methacrylol, styrenic, (meth)allyl groups, mercapto groups, keto or aldehyde groups (such as methylvinylketone, diacetoneacrylamide and (meth)acroleine).

Particularly preferred dispersed vinyl polymer(s) are acrylic polymer(s) prepared from acrylic monomers as described above.

If the dispersed polymer(s) is a vinyl polymer, the dispersed vinyl polymer may in some embodiments comprise at least 15 wt. %, more preferably at least 40 wt. % and most preferably at least 60 wt. % of polymerised vinyl acetate. If the dispersed vinyl polymer comprises at least 50 wt. % of polymerised vinylacetate then preferably the dispersed vinyl polymer also comprises 10–49 wt. % of either n-butylacrylate or a branched vinylester, for example VeoVa 10.

In a preferred embodiment the dispersed vinyl polymer(s) comprises:

I. 15 to 60 wt. % of styrene and/or α-methylstyrene;
II. 15 to 80 wt. % of one or more of methyl methacrylate, ethyl methacrylate, cyclohexyl(meth)acrylate and n-butyl methacrylate;
III. 0 to 5 wt. %, more preferably 0 to 3.5 wt. %, of vinyl monomer(s) containing a carboxylic acid group(s);
IV. 0 to 10 wt. %, more preferably 0 to 5 wt. % of vinyl monomer(s) containing a non-ionic water-dispersing group(s);
V. 5 to 40 wt. % of vinyl monomer(s) other than as in I to IV, VI and VII;
VI. 0 to 5 wt. % of vinyl monomer(s) containing wet adhesion promoter or crosslinker groups (excluding any within the scope of III and VII); and
VII. 0 to 8 wt. %, more preferably 0 to 4 wt. %, and most preferably 0.5 to 3 wt. % of a polyethylenically unsaturated vinyl monomer, wherein I)+II) add up to at least 50 wt. % and I+II+III+IV+V+VI+VII add up to 100%.

The dispersed polymer(s) can be prepared by any known technique. Preparation techniques particularly include either dispersing a pre-formed polymer or polymer solution in water or if the dispersed polymer(s) is a vinyl polymer directly synthesising the vinyl polymer in water (for example by emulsion polymerisation, micro-suspension polymerisation or mini emulsion polymerisation). Methods for preparing aqueous dispersed polymer(s) are reviewed in the Journal of Coating Technology volume 66, number 839, pages 89–105 (1995) and these methods are included herein by reference. Preferably dispersed vinyl polymer(s) are prepared by the emulsion polymerisation of free radically polymerisable olefinically unsaturated monomers (Emulsion Polymerisation and Emulsion Polymers, P. Lovell, M. S. El-Aasser, John Wiley, 1997). Any published variant of the emulsion polymerisation process may be utilised to prepare the dispersed polymer(s), including the use of seeded emulsion polymerisation techniques to control particle size and particle size distribution, especially when working in the particle size range 300–700 nm when the seeded technique is useful for giving good particle size control. Other useful techniques are the so called sequential polymerisation technique and the power feed technique (chapter 23 in "Emulsion Polymers and Emulsion Polymerisation" D R Basset and A E Hamielec, ACS Symposium Series No 165, 1981).

Preferably the dispersed polymer(s) is colloid stable and it is also desirable that colloid stability is maintained for as long as possible into the drying process since early loss of colloid stability can bring a premature end to open time. Since the final coating composition may often contain co-solvents and dissolved ionic species (e.g. from pigment dissolution and from the presence of neutralising agents), it is desirable that the colloid stability of the dispersed polymer(s) is adequate to withstand any destabilising influences of these components. Colloid stability may be achieved by the addition of conventional non-ionic surfactants, optionally with the addition of anionic surfactants at any stage during the preparation of the aqueous composition of the invention. Strongly adsorbing surfactants capable of providing steric stability are preferred. Higher levels of colloid stability may be obtained by chemically binding or partially binding hydrophilic stabilising groups such as polyethylene oxide groups to the surface of dispersed polymer(s) particles. Suitable surfactants and stabilising groups are described in "Non Ionic Surfactants-Physical Chemistry" (M J Schick, M Dekker Inc. 1987) and "Polymer Colloids" (Buscall, Corner & Stageman, Elsevier Applied Science Publishers 1985).

Chemical binding (grafting) of hydrophilic stabilising groups onto dispersed polymer(s) particles can be achieved by the use of a comonomer, polymerisation initiator and/or chain transfer agent bearing the stabilising group, for example methoxy(polyethylene oxide)$_{30}$ methacrylate may be introduced as a comonomer into an emulsion polymerisation to give rise to stabilised dispersed polymer particles with bound polyethylene oxide groups on the particle surface. Another method of producing a strongly sterically stabilised dispersed polymer(s) is to introduce cellulosic derivatives (e.g. hydroxy ethyl cellulose) during an emulsion polymerisation (see for example D H Craig, Journal of Coatings Technology 61, no. 779, 48, 1989). Hydrophilic stabilising groups may also be introduced into a preformed polymer before it is subsequently dispersed in water, as described in EP 0317258 where polyethylene oxide groups are reacted into a polyurethane polymer which is subsequently dispersed in water and then chain extended.

The combination of non-crosslinkable oligomer(s) and dispersed polymer(s) is most conveniently prepared by physically blending the corresponding aqueous dispersions. However other methods of preparing the combination can sometimes be utilised. One such method is to prepare the non-crosslinkable oligomer(s) in organic solvent solution as previously discussed, and to disperse this solution directly into an aqueous dispersed polymer(s). Alternatively the organic solvent can be removed from the non-crosslinkable oligomer(s) solution, and the non-crosslinkable oligomer(s) directly dispersed into an aqueous dispersed polymer(s). The dispersed polymer(s) can also be added to an organic solvent solution of the non-crosslinkable oligomer(s). Another method is to introduce the non-crosslinkable oligomer(s) into an aqueous free radical polymerisation reaction which produces the dispersed polymer(s). Such an introduction of non-crosslinkable oligomer(s) may be at the commencement of the aqueous free radical polymerisation and/or during the aqueous free radical polymerisation. (Also, as mentioned previously, a dispersed polymer(s) can sometimes be formed in-situ from the synthesis of a oligomer as a very high molecular weight polymer fraction resulting from the oligomer synthesis).

The non-crosslinkable oligomer(s) may also be diluted with reactive diluent (for example vinyl monomers) at any stage of its preparation and then dispersed in water containing a dispersed polymer(s), followed by polymerisation of the reactive diluent in the presence of the non crosslinkable oligomer(s) and the dispersed polymer(s). Optionally, depending on the nature of the reactive diluent, no further polymerisation of the reactive diluent prior to use in a coating may be required.

Alternatively the non-crosslinkable oligomer(s) and dispersed polymer(s) may be combined by preparing a redispersible dry powder form of the dispersed polymer(s), and then dispersing the redispersible dry powder directly into an aqueous dispersion of the non-crosslinkable oligomer(s). Methods for preparing redispersible dry powders from polymer emulsions are described for example in U.S. Pat. No. 5,962,554, DE 3323804 and EP 0398576.

In a preferred embodiment of the invention the non-crosslinkable oligomer(s) and the dispersed polymer(s) are compatible in the drying aqueous composition. Preferably the non-crosslinkable oligomer(s) and the dispersed polymer(s) give clear films upon film formation after coating of the aqueous composition onto a substrate.

Preferably the ratios by weight of solid material of non-crosslinkable oligomer(s) to dispersed polymer(s) i.e. a):b), are in the range of from 8:92 to 50:50, more preferably in the range of from 10:90 to 40:60, still more preferably in the range of from 15:85 to 30:70 and most preferably in the range of from 25:75 to 50:50.

The aqueous coating compositions of the invention are particularly useful when in the form of final coating formulations (i.e. composition intended for application to a substrate without any further treatment or additions thereto) such as protective or decorative coating compositions (for example paint, lacquer or varnish) wherein an initially prepared composition may be further diluted with water and/or organic solvents and/or combined with further ingredients, or may be in more concentrated form by optional evaporation of water and/or organic components of the liquid medium of an initially prepared composition.

Preferably the evaporation rate of any co-solvent used is ≦0.6, more preferably ≦0.15, most preferably ≦0.08 and especially ≦0.035. Values for evaporation rates were published by Texaco Chemical Company in a bulletin Solvent Data: Solvent Properties (1990). (The values given are relative to the evaporation rate (ER) is defined as 1.00). Determination of evaporation rates of solvents that are not listed the Texaco bulletin is as described in ASTM D3539.

In a special embodiment, the amount of co-solvent(s) used in the invention composition is preferably linked to the Mw of the non-crosslinkable oligomer(s) in the composition. For a non-crosslinkable oligomer(s) with Mw in the range 1,000 to 40,000 Daltons, the amount of co-solvent, i.e. c), is preferably 0 to 15 wt. % based on the weight of the composition, more preferably 0 to 10 wt. %. For a non-crosslinkable oligomer(s) with Mw in the range of from 40,000 to 80,000 Daltons, the corresponding figures for the preferred amount of co-solvent are 0 to 18 wt. %, more preferably 5 to 18 wt. %.

Furthermore, there is also a preferred relationship between the amount of co-solvent used and the amount of binder polymer solids (non-crosslinkable oligomer plus dispersed polymer), the amount of co-solvent is preferably ≦50 wt % based on the weight of binder polymer solids in the composition, more preferably ≦35 wt %, more preferably ≦20 wt %, more preferably ≦10 wt %, and especially preferably 0 wt % with the proviso that the amount of co-solvent is 0 to 20 wt % of the composition.

An advantage of the present invention is that (if used) co-solvent can; if as is often required for environmental and safety reasons, be present at very low concentrations because of the plasticising nature of the non-crosslinkable oligomer(s). Preferably the co-solvent to water ratio is below 0.8, more preferably below 0.4, most preferably below 0.2 and especially below 0.1. The co-solvent(s) can all be added at the final formulation step. Alternatively some or all of the co-solvent in the final formulation can be the co-solvent utilised in the preparation of the non-crosslinkable oligomer(s). An important consideration when choosing a co-solvent is whether or not the co-solvent is compatible with the non-crosslinkable oligomer(s) and/or the dispersed polymer(s) and the effect of any co-solvent partitioning (and the partitioning of the co-solvent in the (aqueous) oligomer phase versus the dispersed polymer particles is preferably >1/1, more preferably >2/1 and most preferably >3/1). If the co-solvent is more compatible with the dispersed polymer(s) it will swell the dispersed polymer, thus increasing the overall viscosity. Preferably any co-solvent present in the aqueous composition of the invention is more compatible with the non-crosslinkable oligomer(s) then with the dispersed polymer(s), so that the dispersed polymer(s) undergoes little if any swelling by the co-solvent. The co-solvent selection is often determined by experimentation and/or by the use of a solubility parameter concept i.e. maximising the difference in the solubility parameter of the dispersed polymer(s) and solvent leads to a minimisation of the co-solvent uptake by the dispersed polymer(s). Solubility parameters of a range of solvents and a group contribution method for assessing the solubility parameters of polymers are given by E A Grulke in the "Polymer Handbook" (John Wiley pages 519–559, 1989) and by D W Van Krevelen and P J Hoftyzer in "Properties of Polymers. Correlations With Chemical Structure" (Elsevier, New York, 1972 chapters 6 and 8). Co-solvent uptake of the dispersed polymer(s) may also be decreased by increasing its Tg so that the dispersed polymer(s) is in the glassy region at ambient temperature, or by pre-crosslinking the dispersed polymer(s) as described above.

The aqueous coating composition of the invention may be applied to a variety of substrates including wood, board, metals, stone, concrete, glass, cloth, leather, paper, plastics, foam and the like, by any conventional method including brushing, dipping, flow coating, spraying, and the like. They are, however, particularly useful for providing coatings on wood and board substrates. The aqueous carrier medium is removed by natural drying or accelerated drying (by applying heat) to form a coating.

Accordingly, in a further embodiment of the invention there is provided a coating obtainable from an aqueous coating composition of the present invention.

The aqueous coating composition of the invention may contain other conventional ingredients, some of which have been mentioned above; examples include pigments (especially inorganic pigments), dyes, emulsifiers, surfactants, plasticisers, thickeners, heat stabilisers, levelling agents, anti-cratering agents, fillers, sedimentation inhibitors, UV absorbers, antioxidants, dispersants, flow agents, adhesion promoters, defoamers, co-solvents, wetting agents; oligomers and polymers (crosslinkable and/or non-crosslinkable) which are not according to the invention such as may be used in conventional binder systems; and the like introduced at any stage of the production process or subsequently. Preferably the composition of the invention comprises 0 to 50 wt %, more preferably 0 to 40 wt %, most preferably 0 to 35 wt %, especially 0 to 30 wt %, more especially 0 to 25 wt % and most especially 5 to 25 wt % of pigment(s). It is possible to include an amount of antimony oxide in the dispersions to enhance the fire retardant properties. Optionally external crosslinking agent(s) may be added to the aqueous composition of the invention to aid crosslinking of the dispersed polymer(s) during and after drying.

In particular, the aqueous coating compositions of the invention, if the dispersed polymer(s) is autoxidisable, advantageously include a drier salt(s). Drier salts are well known to the art for further improving curing in unsaturated film-forming substances. Generally speaking, drier salts are metallic soaps, that is salts of metals and long chain carboxylic acids. It is thought that the metallic ions effect the curing action in the film coating and the fatty acid components confer compatibility in the coating medium. Examples of drier metals are cobalt, manganese, zirconium, lead, neodymium, lanthanum and calcium. The level of drier salt(s) in the composition is typically that to provide an amount of metal(s) within the range of from 0.01 to 0.5% by weight based on the weight of autoxidisable dispersed polymer(s).

Drier salts are conventionally supplied as solutions in white spirit for use in solvent-borne alkyd systems. They may, however, be used quite satisfactorily in aqueous coating compositions since they can normally be dispersed in such systems fairly easily. The drier salt(s) may be incorporated into the aqueous coating composition at any convenient stage. Drier accelerators may be added to the drier salts. Suitable drier accelerators include 2,2'-bipyridyl and 1,10-phenanthroline.

FIGS. 1 to 4 illustrate the drying profile of a composition according to the present invention [Example 3], where the equilibrium viscosity is measured as the solids content increases.

FIG. 1 shows the drying profile measured using a shear rate of $0.1\ s^{-1}$.

FIG. 2 shows the drying profile measured using a shear rate of $1.0\ s^{-1}$.

FIG. 3 shows the drying profile measured using a shear rate of $10.0\ s^{-1}$.

FIG. 4 shows the drying profile measured using a shear rate of $77.9\ s^{-1}$.

Figure 1:
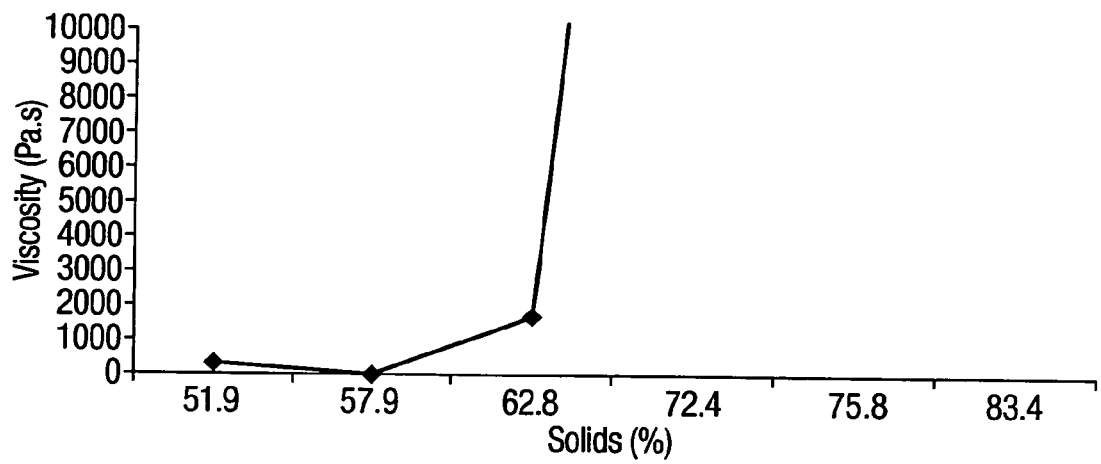

The present invention is now illustrated by reference to the following examples. Unless otherwise specified, all parts, percentages and ratios are on a weight basis.

Test Methods:

To test for the open time and wet edge time of the aqueous compositions prepared as described in the examples below, the aqueous composition was applied using a wire rod to a test chart (18×24 cm, form 8B-display, available from Leneta Company) at a wet film thickness of 120 μm. Open time and wet edge time tests were performed at fairly regular time intervals according to the approximate expected final times in each case (being determined roughly from a trial run), the intervals between measurements decreasing towards the end of the run. The measurements were carried out at relative humidity levels of 50+/−5%, temperatures of 23+/−2° C. and an air flow ≦0.1 m/s.

Open Time:

The open time was determined by brushing at regular time intervals (as mentioned above) a virgin 75 cm² area of the coated chart with a brush (Monoblock no 12, pure bristles/polyester 5408-12) carrying some more of the composition with a brush pressure of 100 to 150 g during 30 seconds. In this time the brush was moved in one set comprising 5 times in the direction of the width of the substrate and 5 times in the direction of length of the substrate before visually assessing the coating. Once the composition carried on the brush no longer formed a homogeneous layer with the coating on the substrate the open time was considered to be over.

Wet Edge Time:

The wet edge time was determined by brushing at regular time intervals (as mentioned above) a virgin 25 cm² edge area of the coated chart with a brush (Monoblock no 12, pure bristles/polyester 5408-12) carrying some more of the composition with a brush pressure of 100 to 150 g during 30 seconds. In this time the brush was moved in one set comprising 5 times in the direction of the width of the substrate and 5 times in the direction of length of the substrate before visually assessing the coating. Once the composition carried on the brush no longer formed a homogeneous layer with the coating on the substrate and/or a visible lap line could be seen the wet edge time was considered to be over.

Drying Time:

To test the dust-free, tack-free and thumb-hard drying stages of the aqueous compositions prepared in the examples as described below, the aqueous composition was applied to a glass plate at a wet film thickness of 80 μm. Drying time tests were performed at regular time intervals at relative humidity levels of 50+/−5%, temperatures of 23+/−2° C. and an air flow ≦0.1 m/s.

Dust-Free Time:

The dust-free time was determined by dropping a piece of cotton wool (about 1 cm³ i.e. 0.1 g) onto the drying film from a distance of 25 cm. If a person could immediately blow the piece of cotton wool from the substrate without leaving any wool or marks in or on the film, the film was considered to be dust-free.

Tack-Free Time:

The tack-free time was determined by placing a piece of cotton wool (about 1 cm³, 0.1 g) on the drying film and placing a metal plate (with a diameter of 2 cm) and then a weight of 1 kg onto the piece of cotton wool (for 10 seconds). If the piece of cotton wool could be removed from the substrate by hand without leaving any wool or marks in or on the film, the film was considered to be tack-free.

Thumb-Hard Time:

The thumb-hard time was determined by placing the coated glass plate on a balance and a thumb was pressed on the substrate with a pressure of 7 kg. The thumb was then rotated 90° under this pressure. If the film was not damaged the coating was dried down to the substrate level and considered to be thumb-hard.

Sandability

Sandability corresponds to the hardness of a coating at the point when a coating can be sanded properly. The composition prepared in the Examples described below was applied to a piece of wood at a wet film thickness of 120 μm. The coating was abraded by hand with sandpaper (grain delicacy P150) at regular time intervals at relative humidity levels of 50+/−5%, temperatures of 23+/−2° C. and an air flow ≦0.1 m/s. When there was no significant clogging (or the coating started powdering) the coating was considered to be sandable.

Viscosity:

All viscosity measurements were performed on a TA Instruments AR2000N Rheometer, using cone & plate and/or plate & plate geometries, depending on the viscosity of the sample to be measured. A Peltier heating/cooling unit in the bottom plate was used to control the temperature.

Solution Viscosity

For the solution viscosity measurements (both at 50±2° C. and at 23±2° C.), a cone & plate (4 cm diameter, 1⁰ angle, gap 29 μm) was used. If the oligomer solutions were too low in viscosity to remain in between the cone and the plate, the cup & spindle C14 geometry was used and the viscosity measurements were performed at a shear rate of $91.9\ s^{-1}$. For both geometries, the gap between the cone and the plate (or between the cup and the spindle) was set to 0.1 mm, prior to each measurement. The solution viscosities of the non-crosslinkable oligomers were measured using the solvent systems and the conditions as defined herein in the statements of invention:

1. The 80% solids solution: The non-crosslinkable oligomer was diluted (if necessary) with the appropriate solvent to an 80% solids solution (in NMP, BG or a mixture of NMP and BG at any ratio) which was homogenised by stirring the solution for 15 minutes at 50° C.

2. The 70% solids solution: The non-crosslinkable oligomer was diluted with the appropriate solvent (or mixture of solvents) to result in a 70% solids solution (either in NMP/water/DMEA or in BG/water/DMEA, or in (a mixture of NMP and BG at any ratio)/water/DMEA; for each solvent mixture the solvents should be present in a weight ratio of 2017/3, respectively) which was homogenised by stirring the solution for 15 minutes at 50° C. The resulting solution was subsequently cooled.

The solution viscosity of the oligomer was measured at a temperature of 50±2° C. for the 80% solids oligomer solution and at 23±2° C. for the 70% solids oligomer solution at a shear rate of 90±5 $s^{-1}$.

Equilibrium Viscosity

The equilibrium viscosity measurements were performed with a plate & plate (diameter 15 mm, gap 500 μm, at 23±0.1° C.). All compositions described in the examples below were used at the solids level at which they were prepared and not diluted to lower solids levels.

Step 1: Three test charts were provided with coatings of identical film thickness. The coatings were applied with a 120 μm wire rod and the actual film thickness (and its uniformity) was checked with a wet film gauge, 20 to 370 μm, of Braive Instruments. The charts were dried under identical conditions in an environment where the air flow was <0.1 m/s.

Step 2: One test chart was used to determine the solids increase in time. The weight of the film was monitored in time, starting right after application of the film. After calculating the solids content at every measurement, a solids-time curve could be constructed and a trend line was calculated for the solids of the film as a function of the drying time.

Step 3: The other two test charts were used to determine the equilibrium viscosity in time: approximately every 5 minutes a sample was scraped from one test chart (in random order) and the viscosity of this sample was measured at 23° C. at representative shear rates, for example at 0.1 $s^{-1}$, 1 $s^{-1}$, 10 $s^{-1}$ and 77.9 $s^{-1}$. The measurements were continued for 90 minutes, unless reproducible sampling from the test charts could not be performed properly within that period of time (due to for example drying of the film to reach the dust free time).

Figure 2:
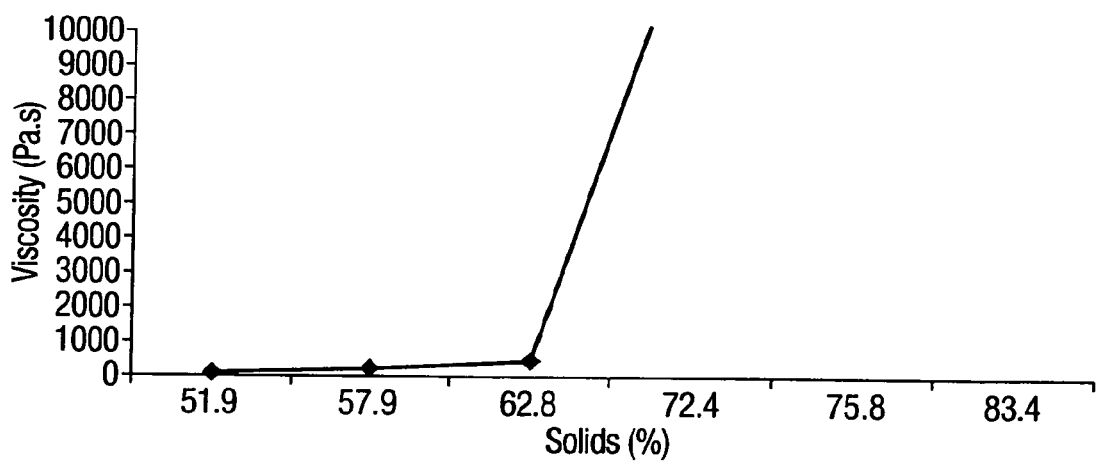

Step 4: The final drying curve of the coating as shown in FIGS. 1 to 4 (in which the equilibrium viscosity is represented as a function of the solids of the drying film) could be constructed from the solids-time curve (Step 2) and the equilibrium viscosity data (Step 3).

Molecular Weight Determination

Gel permeation chromatography (GPC) analyses for the determination of polymer molecular weights were performed on an Alliance Waters 2690 GPC with two consecutive PL-gel columns (type Mixed-C, I/d=300/7.5 mm) using tetrahydrofuran (THF) as the eluent at 1 $cm^3$/min and using an Alliance Waters 2410 refractive index detector. Samples corresponding to about 16 mg of solid material were dissolved in 8 $cm^3$ of THF, and the mixtures were stirred until the samples had dissolved. The samples were left undisturbed for at least 24 hours for complete "uncoiling" and subsequently were filtered (Gelman Acrodisc 13 or 25 mm ø CR PTFE; 0.45 μm) and placed on the auto-sampling unit of the GPC. A set of polystyrene standards (analysed according to DIN 55672) was used to calibrate the GPC.

All species with a molecular weight less than 1000 Daltons are ignored when calculating the Mw and PDi for the non-crosslinkable oligomers. When Daltons are used in this application to give molecular weight data (g/mole), it should be understood that this is not a true molecular weight, but a molecular weight measured against polystyrene standards as described above.

Water Solubility

The water solubility of non-crosslinkable oligomer(s) was determined as follows: A sample of a non-crosslinkable oligomer was dispersed in water and diluted with water/ammonia to 10% solids and the pH adjusted to the desired pH, within a range of from 2 to 10, and the dispersion was then centrifuged over 5 hours at 21000 rpm at 23±2° C. on a Sigma 3K30 centrifuge (21,000 rpm corresponds to a centrifugal force of 40,000 g). The pH chosen should be the pH where the non-crosslinkable oligomer is expected to be most soluble, for example often a pH of about 9 is suitable for anionic stabilised dispersions and a pH of about 2 is often suitable for cationic stabilised dispersions. After centrifugation a sample of the supernatant liquid was taken and evaporated for 1 hour at 150° C. to determine the solids content of the supernatant liquid. The water-solubility percentage was calculated by dividing the amount of solids (g) of the supernatant by the total of amount of solids in the sample and multiplying by 100.

Surface Hardness

König hardness was determined following DIN 53157 NEN5319 using Erichsen hardness measuring equipment. The values are given in second(s) and the higher the value is the harder the coating is.

Water Resistance

The examples prepared as described below were cast down on Leneta test charts Form 2C with a wet film thickness of 100 μm. The films were dried at room temperature for 20 minutes and at 50° C. for 16 hours. After they were cooled down to room temperature the films were tested for water resistance.

A drop of water was placed on the films and covered with a watch glass. The water was removed after 4 hours at room temperature and the damage to the coating was assessed. 0 means that the coating was dissolved, 5 means that the coating was not affected at all.

| Materials & Abbreviations used: | |
|---|---|
| MPEG750 = | methoxy polyethylene glycol (Mn ≈ 750) |
| MPEG350MA = | methoxy polyethylene glycol (Mn ≈ 350) methacrylate available from LaPorte |
| DMPA = | dimethylol propionic acid |
| NMP = | N-methyl pyrrolidone |
| TDI = | toluene diisocyanate |
| Dowanol DPM = | dipropylene glycol monomethyl ether |
| Atlas G5000 = | ethoxylated surfactant available from Uniqema |
| Boltorn H20 = | dendritic polymer available from Perstorp |
| Atpol E5720/20 = | fatty alcohol ethoxylate available from Uniqema |
| AP = | ammonium persulphate |
| Aerosol OT-75 = | sodium dioctyl sulphosuccinate available from Cytec |
| MMA = | methyl methacrylate |
| n-BA = | n-butyl acrylate |
| AA = | acrylic acid |
| SLS = | sodium lauryl sulphate |
| Borax.10$H_2$O = | disodium tetraborate decahydrate |
| Akyposal NAF = | sodium dodecyl benzene sulphonate available from KAO Chemicals |
| Natrosol 250LR = | hydroxy ethyl cellulose available from Hercules |

-continued

Materials & Abbreviations used:

| | |
|---|---|
| Akyporox OP-250V = | octyl phenol ethoxylate available from KAO Chemicals |
| VeoVa 10 = | vinyl ester of versatic acid available from Shell |
| Water = | demineralised water |
| DMEA = | N,N-dimethyl ethanolamine |
| Voranol P400 = | polypropylene glycol available from Now Chemical. |

Preparation of a Non-Crosslinkable Urethane Oligomer: A1

A 1 liter flask, equipped with a stirrer and a thermometer, was loaded with DMPA (48.09), NMP (240.0 g), MPEG750 (19.2 g) and Voranol P400 (618.64 g) in a nitrogen atmosphere. The reaction mixture was stirred until a clear solution was obtained. At a maximum temperature of 25° C., TDI (274.46 g) was fed into this reaction mixture without exceeding a reactor temperature of 50° C. After the TDI-feed was complete, the reaction mixture was heated to 80° C. and stirred at this temperature for 1 hour after which the NCO-free urethane oligomer A1 was obtained.

Preparation of a Non-Crosslinkable Urethane Oligomer Dispersion: DA1

At a temperature of 70° C., the alkyd urethane oligomer A1 was diluted with Dowanol DPM (123.34). Subsequently DMEA (32.24) was added and the mixture was stirred for 15 minutes. Then water (373.12 g) was added and the temperature was lowered to 55 to 60° C. The resultant predispersion was stirred for an additional 15 minutes. Part of the resultant predispersion (1100 g), at 55 to 60° C., was dispersed in water (736.7 g; 45 to 50° C.), over 60 minutes and under a nitrogen atmosphere. After the addition was complete, the final dispersion was stirred for an additional 15 minutes, cooled to ambient temperature, filtered over a 200-mesh sieve and stored under nitrogen. The dispersion DA1 had a solids content of 30.7 wt % and a pH of 7.04.

Preparation of a Non-Crosslinkable Hyperbranched Polyester Amide Oligomer: A2

A 2 liter flask fitted with a stirrer, a thermometer and a condenser fitted with a Dean-Stark condensate trap, was loaded with diisopropanol amine (297.15 g) in a nitrogen atmosphere. Stirring was started and hexahydrophthalic anhydride (309.56 g) was added in one portion. This caused an exothermic reaction and the temperature rose to 140° C. Then lauric acid (393.29 g) was added and the reaction mixture was heated to 180° C. The mixture was kept at 180° C. and water was collected until an acid value of 3.8 mg KOH/g was obtained. The reaction mixture was allowed to cool to 100° C. and then succinic anhydride (41.35 g) was added. The resulting reaction mixture was heated to 120° C., and was stirred at this temperature until all the anhydride had reacted, as judged from an Infra Red spectrum of the reaction mixture.

Preparation of a Non-Crosslinkable Hyperbranched Polyester Amide Oligomer Dispersion: DA2

At 70° C., a portion of the hyperbranched polyester amide A2 (195.22 g) was diluted with Dowanol DPM (77.78 g) and DMEA (8.47 g) was subsequently added. The resultant solution was dispersed in water by the addition of hot water (50° C., 368.53 g) over a period of 10 minutes. The resulting dispersion DA2 was stirred for an additional 30 minutes at 50° C. and subsequently cooled to ambient temperature, filtered and stored in a nitrogen atmosphere. The dispersion DA2 had a solids content of 30.0 wt %.

Preparation of a Non-Crosslinkable Vinyl Oligomer Dispersion: DA3

A 2 liter flask, equipped with stirrer and condenser, was charged with 47 parts of demineralised water and 0.18 parts of a 30 wt % solution of SLS in water. The mixture was heated up to 70° C. at which point 10 wt % of a monomer feed consisting of 12 parts of demineralised water, 0.55 parts of a 30 wt % solution of SLS in water, 0.69 parts of lauryl mercaptane, 2.89 parts of MPEG350MA, 23.14 parts of n-BA, and 2.89 parts of MMA was added. The mixture was further heated to 75° C. and 21.99 parts of a 1.77 wt % solution of AP in water was added. The batch was then heated to 85° C. As soon as the polymerisation temperature was reached the remainder of the monomer feed was added over a period of 120 minutes and 51.4 parts of a 1.77 wt % solution of AP in water was added over a period of 130 minutes. At the end of the monomer feed the feed tank was rinsed with 5 parts of demineralised water and the temperature of 85° C. was maintained for 20 minutes. Next, enough of a solution of 0.095 parts of dimethyl ethanol amine in 0.038 parts of demineralised water was added to the flask to reach a pH of 7.5. The temperature of 85° C. was maintained for another 20 minutes after which the batch was cooled to 60° C. At that point 0.096 parts of a 30 wt % solution of t-butyl hydroperoxide in water was added to the flask followed by 0.578 parts of a 5 wt % solution of isoascorbic acid in water. The batch was stirred for another 30 minutes before it was cooled to room temperature. 0.289 parts of Proxel Ultra 10 was added as a bacteriocide and the emulsion was filtered.

The final dispersion DA3 had a solids content of 30 wt % and a particle size of 120 nm.

Preparation of a Non-Crosslinkable Polyester Ether Oligomer: A4

A 1 liter flask fitted with a stirrer, a thermometer and a condenser fitted with a Dean-Stark condensate trap, was loaded with polypropylene glycol (PPG-2000; 350.00 g) and lauric acid (61.54 g) in a nitrogen atmosphere. Stirring was started and the reaction mixture was heated to 230° C. The mixture was kept at 230° C. and water was collected until an acid value of <5 mg KOH/g was obtained. The reaction mixture was then allowed to cool to room temperature and collected.

Preparation of a Non-Crosslinkable Polyester Ether Oligomer Dispersion DA4

In a 500 cm$^3$ flask, a portion of the polyester ether A4 (30.0 g) was mixed with ATLAS G5000 (1.5 g), Dowanol DPM (12.0 g) and DMEA (0.06 g) and the mixture was stirred at 50° C. until a clear solution was obtained. Then hot water (61.4 g; 50° C.) was added to the flask and the resulting dispersion was stirred at 50° C. for an additional 30 minutes. After cooling to room temperature, the product dispersion was filtered and collected as a translucent dispersion DA4 with a solids content of 30.0 wt %.

Preparation of a Non-Crosslinkable Polyester Oligomer: A5

A 1 liter flask fitted with a stirrer, a thermometer and a condenser fitted with a Dean-Stark condensate trap, was loaded with a reaction mixture containing DMPA (44.7 g), adipic acid (194.7 g) and butanediol (135.09). The mixture was heated to 180° C. while stirring and the reaction water was collected by destillation. The reaction mixture was stirred at 180° C. until an acid value around 40 mg KOH/g was obtained. Then the mixture was cooled to room temperature and collected. The product polyester oligomer A5, which slowly solidified after prolonged standing at room temperature, had a final acid value of 40.2 mg KOH/g.

Preparation of a Non-Crosslinkable Polyester Oligomer Dispersion: DA5

In a 500 cm³ flask, a portion of the polyester A6 (150.0 g) was mixed with Dowanol DPM (60.0 g) and DMEA (9.59 g) and the mixture was stirred at 50° C. until a clear solution was obtained. Then hot water (280.41 g; 50° C.) was added to the flask and the resulting dispersion was stirred at 50° C. for an additional 30 minutes. The final dispersion DA5 had a solids content of 30.0 wt %.

Preparation of a Non-Crosslinkable Hyperbranched Polyester Macromolecule A6

A 2 liter flask, equipped with stirrer, was loaded with MPEG750 (1323.53 g) and succinic anhydride (176.47 g) in a nitrogen atmosphere. The reaction mixture was heated to 120° C., and was stirred at this temperature until all the anhydride had reacted, as judged from an Infra Red spectrum of the reaction mixture (the anhydride groups typically show two absorptions at 1785 cm$^{-1}$ and 1865 cm$^{-1}$, which disappeared and were replaced by a new ester carbonyl absorption at 1740 cm$^{-1}$). The clear liquid product was then cooled to 50° C. and collected. The product solidified when left undisturbed at ambient temperature.

A separate 2 liter flask fitted with a stirrer, a thermometer and a condenser fitted with a Dean-Stark condensate trap, was loaded with Boltorn H20 (Trademark from Perstorp AB; 189.38 g), the MPEG750/SAN adduct as prepared above (273.92 g), lauric acid (236.70 g) and phosphoric acid (0.5 g) in a nitrogen atmosphere. The reaction mixture was heated to 220° C. and water was collected until an acid value of 4.9 mg KOH/g was obtained.

Preparation of a Non-Crosslinkable Hyperbranched Macromolecule Dispersion DA6

At 70° C., a portion of the hyperbranched polyester A6 (199.18 g) was diluted with Dowanol DPM (39.84 g) and NMP (39.84 g) and DMEA (1.14 g) was subsequently added. The resultant solution was dispersed in water by the addition of hot water (50° C.; 383.94 g) over a period of 10 minutes to the stirred solution of the hyperbranched oligomer. The resulting dispersion DA6 was stirred for an additional 30 minutes at 50° C. and subsequently cooled to ambient temperature and stored in a nitrogen atmosphere. The dispersion DA6 had a solids content of 30.0 wt %.

The properties (acid values, Mw, PDi and solution viscosities) of the oligomers A1 to A6 are given below in Table 1.

TABLE 1

| | Oligomers | | | | | |
|---|---|---|---|---|---|---|
| | A1 | A2 | A3 | A4 | A5 | A6 |
| Acid value mg KOH/g) | 20.9 | 24.3 | 0 | 1.3 | 40.2 | 4.9 |
| Solution viscosity (a) (Pa · s) | 87.5 | 8.8 | 1.1 | 0.04 | 0.10 | 0.42 |
| Solution viscosity (b) (Pa · s) | 72.8 | 92.6 | 3.5 | 0.14 | 0.21 | 1.74 |
| Mw (Daltons) | 15,500 | 23,400 | 23,000 | 3,870 | 4200 | 37000 |
| PDi | 1.82 | 7.1 | 2.1 | 1.2 | 2.3 | 10.3 |
| Water solubility | 100 | 77.9 | 0.8 | 3.1 | 68.2 | 64.8 |
| Tg (° C.) | 5 | 11 | −52 | not measurable | −54 & −38 | −52 |

Key:
(a) = oligomer solution (80%) in NMP (A1, A2, A4, A5, A6) or BG (A3) at 50° C., shear rate 90 s$^{-1}$ (A1), 91.9 s$^{-1}$ (A2), 92.5 s$^{-1}$ (A3), 91.9 s$^{-1}$ (A4 to A6).
(b) = oligomer solution (70%) in NMP/Water/DMEA (20/7/3) (A1, A2, A4, A5, A6) or BG/Water/DMEA (20/7/3) (A3) at 23° C., shear rate 90 s$^{-1}$ (A1), 91.9 s$^{-1}$ (A2), 92.5 s$^{-1}$ (A3), 91.9 s$^{-1}$ (A4 to A6).

Preparation of Dispersed Vinyl Polymer P1

A 2 liter reactor, equipped with stirrer, thermometer and vortex breakers, was loaded with demineralised water (652.57 g), Atpol E5720/20 (4.99 g) and Borax.10H$_2$O (3.57 g) in a nitrogen atmosphere. The mixture was heated whilst stirring to 80° C. and then a solution of AP (2.31 g) in demineralised water (16.00 g) was added. In a dropping funnel a pre-emulsion was prepared by stirring a mixture of demineralised water (161.87 g), Atpol E5720/20 (94.85 g), Aerosol OT-75 (7.20 g), Borax.10H$_2$O (1.07 g), MMA (534.18 g), n-BA (444.32 g) and M (19.97 g). 5% of this pre-emulsion was added to the reactor at 80° C. over 5 minutes. The remainder was fed into the reactor over 160 minutes at 85° C. A solution of AP (0.53 g) in demineralised water (7.88 g) was added to the reactor during the first 15 minutes of feeding the pre-emulsified feed. Then the reactor content was kept at 85° C. for 30 minutes, and then cooled to ambient temperature. The pH was adjusted to 8 to 8.5 with 12.5% aqueous ammonia. The resultant dispersed product (P1) was filtered and collected.

Dispersed Urethane Polymer P2 (NeoRez R-2001)

This is a high molecular weight alkyd urethane dispersion obtainable from Avecia BV, The Netherlands. NeoRez is a trademark of Avecia.

Preparation of Dispersed Vinyl Polymer P3

A 2 liter reactor, equipped with stirrer, thermometer and vortex breakers, was loaded with demineralised water (194.509), Akyposal NAF (3.00 g), Borax.10H$_2$O (1.25 g), acetic acid (0.50 g) and Natrosol 250LR (10.00 g) in a nitrogen atmosphere. The mixture was heated whilst stirring to 60° C. and then a solution of AP (0.50 g) in demineralised water (10.00 g) was added. In a dropping funnel a pre-emulsion was prepared by stirring with demineralised water (171.71 g), Akyposal NAF (3.00), Borax.10H$_2$O (1.25 g), acetic acid (0.50 g) and Akyporox OP-250V (14.29 g) followed by VeoVa 10 (125.00 g) and vinyl acetate (375.00 g). 10% of this mixture was added to the reactor at 60° C. The mixture was heated whilst stirring to 80° C. The remainder was fed into the reactor over 90 minutes at 80° C. The content of a separate dropping funnel, containing a solution of AP (1.15 g) in demineralised water (60.00 g), was added in the same time. Then the reactor content was kept at this temperature for 120 minutes and then cooled to ambient temperature. The pH was adjusted to 8 to 8.5 with 12.5% aqueous ammonia. The resultant product P3 was filtered and collected.

Preparation of a Sequential Dispersed Vinyl Polymer P4

A 2 liter reactor, equipped with stirrer, thermometer and vortex breakers, was loaded with demineralised water (990.94 g), SLS (30%, 0.55 g) and NaHCO$_3$, (4.44 g) in a nitrogen atmosphere. The mixture was heated whilst stirring to 80° C. and then a solution of AP (0.89 g) in demineralised water (5.00 g) was added. In a dropping funnel a monomer mixture was prepared by stirring MMA (140.48 g), n-BA (207.71 g) and M (7.11 g). 10% of this mixture was added to the reactor at 80° C. The remainder was fed into the reactor over a period of 40 minutes at 85° C. The content of a separate dropping funnel, containing demineralised water (20.00 g), AP (0.36 g) and SLS 30% (11.62 g) was added in the same time. The reactor content was kept at 85° C. for 30 minutes. A second monomer mixture was prepared in a dropping funnel consisting MMA (464.91 g), n-BA (57.37 g) and AA (10.66 g). The mixture was fed to the reactor after the 30 minutes period in 60 minutes. The content of a separate dropping funnel, containing demineralised water (30.00 g), AP (0.53 g) and SLS 30% (17.44 g) was added in the same time. The reactor content was kept at 85° C. for 45 minutes and then cooled to ambient temperature. The pH was adjusted to 8 to 8.5 with 12.5% aqueous ammonia. The resultant product P4 was filtered and collected.

The properties of P1 to P4 are given in Table 2 below.

TABLE 2

| | Polymer | | | |
|---|---|---|---|---|
| | P1 | P2 | P3 | P4 |
| Solids [wt %] | 51.2 | 35.0 | 50.3 | 45.1 |
| pH | 8.3 | 7.7 | 8.2 | 8.3 |
| Particle size [nm] | 450 | 60 | 330 | 230 |
| Measured Tg [° C.] with DSC (midpoint) | 25 | 61 | 24 | 2 |
| Acid value theoretical on solids [mg KOH/g]. | 15.6 | 14.8 | 0 | 15.6 |

Preparation of a Blend of Oligomer Dispersion DA1 and Dispersed Polymer P1=A1P1

A 500 cm$^3$ flask, equipped with a stirrer, was loaded with DA1 (150.0 g) in a nitrogen atmosphere, after which dispersion P1 (89.24 g) was added while stirring the mixture. The blend was stirred for an additional 20 minutes at room temperature. The blend had a solids content of 38.2 wt %, and a pH of 7.5.

A range of blends from oligomer dispersions A1 to A6 and dispersed polymers P1 to P4 was prepared according to similar procedures using the components given in Table 3 below. The blends for comparative examples C1 and C2 (with too much oligomer or dispersed polymer) are also given in Table 3 below.

TABLE 3

| Components (g) | A1P1 | A1P2 | A2P3 | A3P1 | A1A4P1 |
|---|---|---|---|---|---|
| Oligomer dispersion 1 | DA1 | DA1 | DA2 | DA3 | DA1 |
| Oligomer dispersion 1(g) | 150.00 | 100.00 | 100.00 | 68.89 | 71.43 |
| (% of total solids) | 50 | 40 | 35 | 30 | 25 |
| Oligomer dispersion 2 | — | — | — | — | DA4 |
| Oligomer dispersion 2(g) | — | — | — | — | 28.57 |
| (% of total solids) | — | — | — | — | 10 |
| Dispersed polymer | P1 | P2 | P3 | P1 | P1 |
| Dispersed polymer (g) | 89.24 | 129.60 | 111.43 | 94.08 | 107.14 |
| (% of total solids) | 50 | 60 | 65 | 70 | 65 |
| Blend solids (%) | 38.2 | 32.9 | 40.5 | 53.7 | 41.4 |

| Components (g) | A1A4P1* | A1A54 | A6P1 | C1-A1P2 | C2-A1P1 |
|---|---|---|---|---|---|
| Oligomer dispersion 1 | DA1 | DA1 | DA6 | DA1 | DA1 |
| Oligomer dispersion 1(g) | 71.43 | 71.43 | 50.00 | 10.00 | 180.0 |
| (% of total solids) | 25 | 25 | 25 | 5 | 95 |
| Oligomer dispersion 2 | DA4 | DA5 | — | — | — |
| Oligomer dispersion 2(g) | 28.57 | 28.57 | — | — | — |
| (% of total solids) | 10 | 10 | — | — | — |
| Dispersed polymer | P1 | P4 | P1 | P2 | P1 |
| Dispersed polymer (g) | 107.14 | 123.81 | 86.54 | 163.94 | 5.51 |
| (% of total solids) | 65 | 65 | 75 | 95 | 5 |
| Additive | Iron oxide paste (48%) | — | — | — | — |
| Additive (g) | 8.29 | — | — | — | — |
| Blend solids (%) | 41.7 | 38.3 | 43.9 | 46.7 | 30.9 |

Pigmented Paint Composition Comprising A1P1

A 500 cm$^3$ flask, equipped with a stirrer, was loaded with A1P1 (200.0 g) and a TiO$_2$-based pigment paste (94.78 g; 70.8 wt % titanium dioxide) in a nitrogen atmosphere, and the mixture was stirred for 30 minutes at ambient temperature. The resulting paint formulation had a solids content of 50.2%. Then a wetting agent (Byk 24, 0.2 g) was added followed by a thickener (Borchigel L75N/H$_2$O: 1/1, available from Bayer) until a viscosity of 4000 to 6000 mPa·s was reached. The paint formulation was left undisturbed for 24 h, then stirred up to mix the contents intimately, checked (and when necessary corrected) for its viscosity. The drying results are given in Table 4 below.

Paint examples 2 to 8 (and the comparative examples C1 and C2) were prepared according to similar procedures using the components given in Table 4. A1A4P1* is a non pigmented example. The function of the iron oxide paste [1.9% wt % iron oxide of total blend] is to add a tint to the otherwise clear composition to aid the open and wet edge time assessments. In the pigmented examples around 22 wt % of titanium dioxide is added to the blend. The drying and other properties of these examples are also given in Table 4.

The equilibrium viscosities of the paint examples 1 to 8 (and the comparative examples C1 and C2) are given in Tables 5.1 to 5.10.

TABLE 4

| | Paint Example | | | | |
|---|---|---|---|---|---|
| | 1 | 2 | 3 | 4 | 5 |
| Blend | A1P1 | A1P2 | A2P3 | A3P1 | A1A4P1 |
| Blend (g) | 200.00 | 229.60 | 211.43 | 163.97 | 207.14 |
| Pigment paste (g) | 94.78 | 93.00 | 105.41 | 86.03 | 105.51 |
| Open Time (mins) | 37 | 65 | 23 | 50 | 55 |
| Wet edge time (mins) | 21 | 35 | 15 | 26 | 35 |
| Tack-free time (hrs) | 8–17 | <0.5 | <0.5 | 0.75–1 | 0.75–1 |

TABLE 4-continued

| | | | | | |
|---|---|---|---|---|---|
| Dust-free time (hrs) | 2 | 3–3.5 | 9–16 | 7–8 | 20 |
| Thumb-hard time (hrs) | 9–24 | 4.5 | 9–24 | 9 | 21–24 |
| Sandability (hrs) | 9–24 | 9–16 | 9–24 | 9–24 | 28–30 |
| König Hardness (Seconds) | — | 76 | 56 | 14 | — |
| Water resistance | 4 | 5 | 3–4 | 3–4 | — |

| | Paint Example | | | | |
|---|---|---|---|---|---|
| | 6 | 7 | 8 | C1 | C2 |
| Blend | A1A4P1* | A1A5P4 | A6P1 | C1-A1P2 | C2-A1P1 |
| Blend (g) | 215.43 | 223.81 | 136.54 | 200.00 | 185.51 |
| Pigment paste (g) | 0.0 | 105.51 | 73.86 | 127.04 | 70.53 |
| Open Time (mins) | 50 | 65 | 57 | 17 | 70 |
| Wet edge time (mins) | 24 | 32 | 30 | 5 | 26 |
| Tack-free time (hrs) | 0.75–1 | 0.5 | 0.5 | <0.5 | 3–4 |
| Dust-free time (hrs) | 20–21 | 2–2.5 | 9–16 | 3–4 | >140 |
| Thumb-hard time (hrs) | 24 | 8 | 25–26 | 7–8 | >140 |
| Sandability (hrs) | 30 | 9–24 | 24–48 | 9–24 | >140 |
| König Hardness (Seconds) | 10 | 33 | 24 | 91 | — |
| Water resistance | — | 5 | 3–4 | 4–5 | 2–3 |

Key:
— = not measured
Due to the time taken for some of these tests, some of the coatings were left overnight without continuous testing. Therefore when the data says 9–20 it means that by 9 hours it was not sandable but that by 24 hours it was sandable.

TABLE 5.1

Equilibrium viscosity of example 1.

| Time (min) | Calculated Solids (%) | Shear rate 0.1 $s^{-1}$ viscosity (Pa·s) | Shear rate 1.0 $s^{-1}$ viscosity (Pa·s) | Shear rate 10.0 $s^{-1}$ viscosity (Pa·s) | Shear rate 77.9 $s^{-1}$ viscosity (Pa·s) |
|---|---|---|---|---|---|
| 0.0 | 50.20 | 9 | 6 | 4 | 3 |
| 6.5 | 58.35 | 22 | 13 | 9 | 7 |
| 13.5 | 70.18 | 32 | 23 | 15 | 10 |
| 20.0 | 79.00 | 43 | 31 | 21 | 12 |
| 26.0 | 83.31 | 241 | 138 | 87 | 13 |
| 31.5 | 87.49 | 799 | 335 | 162 | 21 |
| 37.0 | 90.90 | 3978 | 688 | 210 | — |
| 40.0 | 91.68 | 5382 | 833 | 228 | — |

TABLE 5.2

Equilibrium viscosity of example 2.

| Time (min) | Calculated Solids (%) | Shear rate 0.1 $s^{-1}$ viscosity (Pa·s) | Shear rate 1.0 $s^{-1}$ viscosity (Pa·s) | Shear rate 10.0 $s^{-1}$ viscosity (Pa·s) | Shear rate 77.9 $s^{-1}$ viscosity (Pa·s) |
|---|---|---|---|---|---|
| 0 | 45.0 | 7 | 2 | 1 | 0.5 |
| 3 | 48.7 | 17 | 9 | 4 | 2 |
| 8 | 57.1 | 789 | 127 | 28 | 10 |
| 13 | 64.4 | 23530 | 7311 | 446 | 9 |
| 18 | 70.6 | 57550 | 17560 | 3421 | 510 |
| 25 | 77.3 | 113800 | 40260 | 6048 | — |

TABLE 5.3

Equilibrium viscosity of example 3.

| Time (min) | Calculated Solids (%) | Shear rate 0.1 $s^{-1}$ viscosity (Pa·s) | Shear rate 1.0 $s^{-1}$ viscosity (Pa·s) | Shear rate 10.0 $s^{-1}$ viscosity (Pa·s) | Shear rate 77.9 $s^{-1}$ viscosity (Pa·s) |
|---|---|---|---|---|---|
| 0 | 51.9 | 331 | 68 | 14 | 4 |
| 4 | 57.9 | 1062 | 202 | 37 | 8 |
| 7 | 62.8 | 1676 | 429 | 119 | 18 |
| 14 | 72.4 | 43350 | 13950 | 2236 | 58 |
| 17 | 75.8 | 116900 | 85070 | 29810 | — |
| 27 | 83.5 | 152000 | 116800 | 101400 | — |

TABLE 5.4

Equilibrium viscosity of example 4.

| Time (min) | Calculated Solids (%) | Shear rate 0.1 $s^{-1}$ viscosity (Pa·s) | Shear rate 1.0 $s^{-1}$ viscosity (Pa·s) | Shear rate 10.0 $s^{-1}$ viscosity (Pa·s) | Shear rate 77.9 $s^{-1}$ viscosity (Pa·s) |
|---|---|---|---|---|---|
| 0 | 53.7 | 8 | 4 | 3 | 1 |
| 3 | 56.7 | 32 | 15 | 9 | 3 |
| 7 | 62.8 | 154 | 74 | 39 | 11 |
| 13 | 71.9 | 5375 | 1306 | 172 | 23 |
| 17 | 77.8 | 20660 | 8787 | 1732 | 677 |
| 23 | 86.6 | 901500 | 205700 | 8181 | 712 |
| 29 | 95.3 | 1103000 | 232100 | 11300 | 1163 |

TABLE 5.5

Equilibrium viscosity of example 5.

| Time (min) | Calculated Solids (%) | Shear rate 0.1 $s^{-1}$ viscosity (Pa·s) | Shear rate 1.0 $s^{-1}$ viscosity (Pa·s) | Shear rate 10.0 $s^{-1}$ viscosity (Pa·s) | Shear rate 77.9 $s^{-1}$ viscosity (Pa·s) |
|---|---|---|---|---|---|
| 0 | 52.7 | 13 | 2 | 1 | 0.3 |
| 4 | 56.4 | 30 | 5 | 2 | 1 |
| 7 | 60.5 | 86 | 17 | 5 | 3 |
| 14 | 69.2 | 1388 | 403 | 113 | 18 |
| 17 | 72.7 | 27080 | 5326 | 645 | 200 |
| 24 | 80.3 | 209000 | 30360 | 2854 | 249 |
| 28 | 84.2 | 220700 | 32670 | 4369 | 454 |

TABLE 5.6

Equilibrium viscosity of non-pigmented example 6.

| Time (min) | Calculated Solids (%) | Shear rate 0.1 $s^{-1}$ viscosity (Pa·s) | Shear rate 1.0 $s^{-1}$ viscosity (Pa·s) | Shear rate 10.0 $s^{-1}$ viscosity (Pa·s) | Shear rate 77.9 $s^{-1}$ viscosity (Pa·s) |
|---|---|---|---|---|---|
| 0 | 41.7 | 21 | 5 | 2 | 1 |
| 3 | 45.6 | 58 | 13 | 6 | 4 |
| 7 | 52.3 | 253 | 66 | 29 | 18 |
| 12 | 60.7 | 5753 | 1151 | 261 | 86 |
| 16 | 67.3 | 169400 | 27070 | 4563 | 1297 |
| 22 | 77.3 | 229500 | 45190 | 7512 | 1993 |

TABLE 5.7

Equilibrium viscosity of example 7.

| Time (min) | Calculated Solids (%) | Shear rate 0.1 s$^{-1}$ viscosity (Pa·s) | Shear rate 1.0 s$^{-1}$ viscosity (Pa·s) | Shear rate 10.0 s$^{-1}$ viscosity (Pa·s) | Shear rate 77.9 s$^{-1}$ viscosity (Pa·s) |
|---|---|---|---|---|---|
| 0 | 50.0 | 23 | 4 | 1 | 0.3 |
| 3 | 52.8 | 57 | 9 | 2 | 0.7 |
| 7 | 57.1 | 152 | 24 | 6 | 2 |
| 13 | 63.6 | 610 | 105 | 26 | 13 |
| 17 | 68.0 | 9782 | 1581 | 230 | 87 |
| 24 | 75.9 | 46080 | 13390 | 4559 | — |
| 29 | 81.6 | 1302000 | 179600 | — | — |

TABLE 5.8

Equilibrium viscosity of example 8.

| Time (min) | Calculated Solids (%) | Shear rate 0.1 s$^{-1}$ viscosity (Pa·s) | Shear rate 1.0 s$^{-1}$ viscosity (Pa·s) | Shear rate 10.0 s$^{-1}$ viscosity (Pa·s) | Shear rate 77.9 s$^{-1}$ viscosity (Pa·s) |
|---|---|---|---|---|---|
| 0 | 54.8 | 18 | 4 | 1 | 1 |
| 4 | 59.9 | 60 | 14 | 5 | 3 |
| 8 | 65.9 | 349 | 66 | 21 | 11 |
| 14 | 74.4 | 120300 | 29010 | 6885 | 76 |
| 17 | 78.4 | 216800 | 42400 | 8226 | 638 |
| 23 | 85.9 | 439700 | 85180 | 15610 | 1892 |

TABLE 5.9

Equilibrium viscosity of comparative example C1.

| Time (min) | Calculated Solids (%) | Shear rate 0.1 S$^{-1}$ viscosity (Pa·s) | Shear rate 1.0 s$^{-1}$ viscosity (Pa·s) | Shear rate 10.0 s$^{-1}$ viscosity (Pa·s) | Shear rate 77.9 s$^{-1}$ viscosity (Pa·s) |
|---|---|---|---|---|---|
| 0 | 46.7 | 6 | 4 | 3 | 2 |
| 3 | 49.1 | 25 | 15 | 8 | 4 |
| 16 | 52.3 | 907 | 289 | 66 | 19 |
| 11 | 56.6 | 14300 | 5932 | 3693 | 851 |
| 17 | 61.0 | 386400 | 123400 | 232600 | — |

TABLE 5.10

Equilibrium viscosity of comparative example C2.

| Time (min) | Calculated Solids (%) | Shear rate 0.1 s$^{-1}$ viscosity (Pa·s) | Shear rate 1.0 s$^{-1}$ viscosity (Pa·s) | Shear rate 10.0 s$^{-1}$ viscosity (Pa·s) | Shear rate 77.9 s$^{-1}$ viscosity (Pa·s) |
|---|---|---|---|---|---|
| 0 | 43.0 | 2 | 2 | 1 | 1 |
| 4 | 48.1 | 9 | 9 | 8 | 7 |
| 8 | 53.9 | 37 | 29 | 25 | 22 |
| 15 | 62.5 | 210 | 55 | 24 | 18 |
| 23 | 69.9 | 1467 | 216 | 51 | 27 |
| 26 | 72.0 | 2295 | 343 | 97 | 57 |
| 30 | 74.3 | 2409 | 446 | 151 | 93 |
| 37 | 76.7 | 2513 | 465 | 157 | 97 |
| 41 | 77.2 | 2576 | 488 | 174 | 113 |
| 48 | 76.5 | 2395 | 472 | 182 | 118 |

The invention claimed is:

1. An aqueous coating composition comprising:
a) 1 to 64 wt % of a non-crosslinkable water-dispersible oligomer(s);
b) 4 to 76 wt % of a dispersed polymer(s);
c) 0 to 20 wt % of co-solvent;
d) 20 to 80 wt % of water;
where a)+b)+c)+d)=100%;
where the weight ratio of a):b) is in the range of from 8:92 to 80:20; and
wherein said composition when drying to form a coating has the following properties:
i) an open time of at least 20 minutes;
ii) a wet edge time of at least 10 minutes;
iii) a tack-free time of ≦24 hours;
iv) an equilibrium viscosity of ≦5,000 Pa·s, at any solids content when drying in the range of from 20 to 55% by weight of the composition, using any shear rate in the range of from 9±0.5 to 90±5 s$^{-1}$ and at 23±2° C.

2. An aqueous coating composition according to claim 1 wherein said non-crosslinkable oligomer(s) has a solution viscosity ≦150 Pa·s, as determined from a 80% by weight solids solution of the non-crosslinkable oligomer(s) in at least one of the solvents selected from the group consisting of N-methylpyrrolidone, n-butylglycol and mixtures thereof, using a shear rate of 90±5 s$^{-1}$ and at 50±2° C.

3. An aqueous coating composition according to claim 1 wherein said non-crosslinkable oligomer(s) has a solution viscosity ≦250 Pa·s, as determined from a 70% by weight solids solution of the non-crosslinkable oligomer(s) in a solvent mixture consisting of:
i) at least one of the solvents selected from the group consisting of N-methylpyrrolidone, n-butylglycol and mixtures thereof;
ii) water and
iii) N,N-dimethylethanolamine;
where i), ii) and iii) are in weight ratios of 20/7/3 respectively, using a shear rate of 90±5 s$^{-1}$ and at 23±2° C.

4. An aqueous composition according to claim 1 wherein said non-crosslinkable oligomer(s) is selected from the group comprising polyurethane oligomer(s), vinyl oligomer(s), polyamide oligomer(s), polyether oligomer(s), polysiloxane oligomer(s), polyester oligomer(s), hyperbranched oligomer(s) and mixtures thereof.

5. An aqueous composition according to claim 1 wherein said composition has an equilibrium viscosity ≦5,000 Pa·s when measured using any shear rate in the range of from 0.09±0.005 to 90±5 s$^{-1}$, and an equilibrium viscosity of ≦3,000 Pa·s when measured using any shear rate in the range of from 0.9±0.05 to 90 ±5 s$^{-1}$, and an equilibrium viscosity of ≦1,500 Pa·s when measured using any shear rate in the range of from 9±0.5 to 90±5 s$^{1}$, at any solids content when drying in the range of from 20 to 55% by weight of the composition and at 23±2° C.

6. An aqueous composition according to claim 1 wherein the non-crosslinkable oligomer(s) has a measured weight average molecular weight in the range of from 1,000 to 80,000 Daltons.

7. An aqueous composition according to claim 1 wherein the non-crosslinkable oligomer(s) has a PDi ≦15.

8. An aqueous composition according to claim 1 wherein the non-crosslinkable oligomer(s) has a measured Tg in the range of from −120 to 250° C.

9. An aqueous composition according to claim 1 wherein the dispersed polymer(s) has a measured weight average molecular weight ≧90,000 Daltons.

10. An aqueous composition according to claim 1 wherein the dispersed polymer(s) has a measured weight average molecular weight <90,000 Daltons with the proviso that the dispersed polymer(s) has a solution viscosity >150 Pa·s, as determined from a 80% by weight solids solution of the dispersed polymer(s) in at least one of the solvents selected from the group consisting of N-methylpyrrolidone, n-butylglycol and mixtures thereof, using a shear rate of $90\pm5$ s$^{-1}$ and at $50\pm2°$ C.

11. An aqueous composition according to claim 1 wherein the dispersed polymer(s) has particle size in the range of from 25 to 1000 nm.

12. An aqueous composition according to claim 1 wherein the dispersed polymer(s) has an acid value below 150 mgKOH/g.

13. An aqueous composition according to claim 1 wherein the dispersed polymer(s) has a measured Tg in the range of from −50 to 300° C.

14. An aqueous composition according to claim 1 wherein the dispersed polymer(s) is a vinyl polymer.

15. An aqueous coating composition according to claim 1 additionally comprising a pigment.

16. A coating obtained from the aqueous composition according to claim 1.

* * * * *